(12) United States Patent
Tariq et al.

(10) Patent No.: US 7,792,530 B2
(45) Date of Patent: Sep. 7, 2010

(54) FACILITATING USE OF A RESTRICTED BASE TRANCEIVER STATION

(75) Inventors: Ahmed Tariq, Port Coquitlam (CA); Elliott Hoole, Sammamish, WA (US); Yan Zhang, Bellevue, WA (US); Donald P. Wahlstrom, Woodinville, WA (US); Jayesh Sukumaran, Woodinville, WA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/811,895

(22) Filed: Jun. 12, 2007

(65) Prior Publication Data

US 2008/0051088 A1 Feb. 28, 2008

Related U.S. Application Data

(60) Provisional application No. 60/830,037, filed on Jul. 11, 2006.

(51) Int. Cl.
*H04W 36/00* (2009.01)
(52) U.S. Cl. .................. 455/436; 455/435.1; 455/432.1; 455/465
(58) Field of Classification Search ............... 455/436, 455/435.1, 432.1, 465
See application file for complete search history.

(56) References Cited

U.S. PATENT DOCUMENTS

| | | | | |
|---|---|---|---|---|
| 6,061,565 | A * | 5/2000 | Innes et al. | 455/436 |
| 7,274,933 | B2 * | 9/2007 | Zinn et al. | 455/435.2 |
| 7,738,922 | B2 | 6/2010 | Hashimoto et al. | |
| 2001/0016490 | A1 * | 8/2001 | Martin-Leon et al. | 455/424 |
| 2004/0204097 | A1 * | 10/2004 | Scheinert et al. | 455/561 |
| 2005/0070283 | A1 * | 3/2005 | Hashimoto et al. | 455/435.1 |
| 2005/0254469 | A1 * | 11/2005 | Verma et al. | 370/338 |
| 2007/0153736 | A1 * | 7/2007 | Mow et al. | 370/331 |

(Continued)

FOREIGN PATENT DOCUMENTS

CN 1602110 3/2005

(Continued)

OTHER PUBLICATIONS

3GPP, "3rd Generation Partnership Project; Technical Specification Group Core Network; NAS Functions related to Mobile Station (MB) in idle mode", Valbonne—France, Release 1999, 3G TS 23.122 V3.2.0 (Mar. 2000).

*Primary Examiner*—Barry W Taylor
(74) *Attorney, Agent, or Firm*—McAndrews, Held & Malloy, Ltd.

(57) ABSTRACT

Facilitating use of a restricted base transceiver station is disclosed. To a first set of subscribers associated with a mobile network operator, access to a mobile network is provided via base transceiver stations associated with a first mobile network identifier associated with the mobile network operator but not via base transceiver stations associated with a second mobile network identifier associated with the mobile network operator. To each of a second set of subscribers associated with the mobile network operator, access to the mobile network is provided via a corresponding subset of a set of base transceiver stations associated with the second mobile network identifier, the subset including for each subscriber in the second set one or more base transceiver stations with respect to which that subscriber is an authorized user.

24 Claims, 26 Drawing Sheets

| U.S. PATENT DOCUMENTS | | | |
|---|---|---|---|
| 2008/0188221 A1 | 8/2008 | Hashimoto et al. | |
| 2008/0304494 A1 | 12/2008 | Yokoyama | |

FOREIGN PATENT DOCUMENTS

| CN | 100574525 | 12/2009 |
|---|---|---|
| EP | 1519613 | 3/2005 |
| JP | 2005109570 | 4/2005 |

\* cited by examiner

FACILITATING USE OF A RESTRICTED BASE TRANCEIVER STATION

CROSS REFERENCE TO OTHER APPLICATIONS

This application claims priority to U.S. Provisional Patent Application No. 60/830,037, entitled METHOD OF ACCESS CONTROL IN A CELLULAR SYSTEM, filed Jul. 11, 2006 which is incorporated herein by reference for all purposes.

BACKGROUND OF THE INVENTION

Traditionally, mobile telecommunications have been provided via a network of fixed, large scale base transceiver stations (BTS) connected via dedicated, fixed lines, such as T-1/E-1 lines, to a base station controller (BSC) which in turn provided access to a core mobile network via a mobile switching center (MSC). Smaller scale base transceiver stations suitable for deployment in a home or office, e.g., to provide dedicated and/or customized service to a limited number of authorized users, have been proposed. However, there is a need in such situations to ensure that only authorized users, e.g., those who have paid for dedicated equipment/service and/or their invited guests, are allowed to access mobile services via a small scale base transceiver station. In addition, there is a need for a way to attract an authorized mobile station (MS) makes use of such a small scale base transceiver, when available, for example to ensure the authorized user benefits from having contracted for dedicated bandwidth, additional and/or different services, differential rates, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
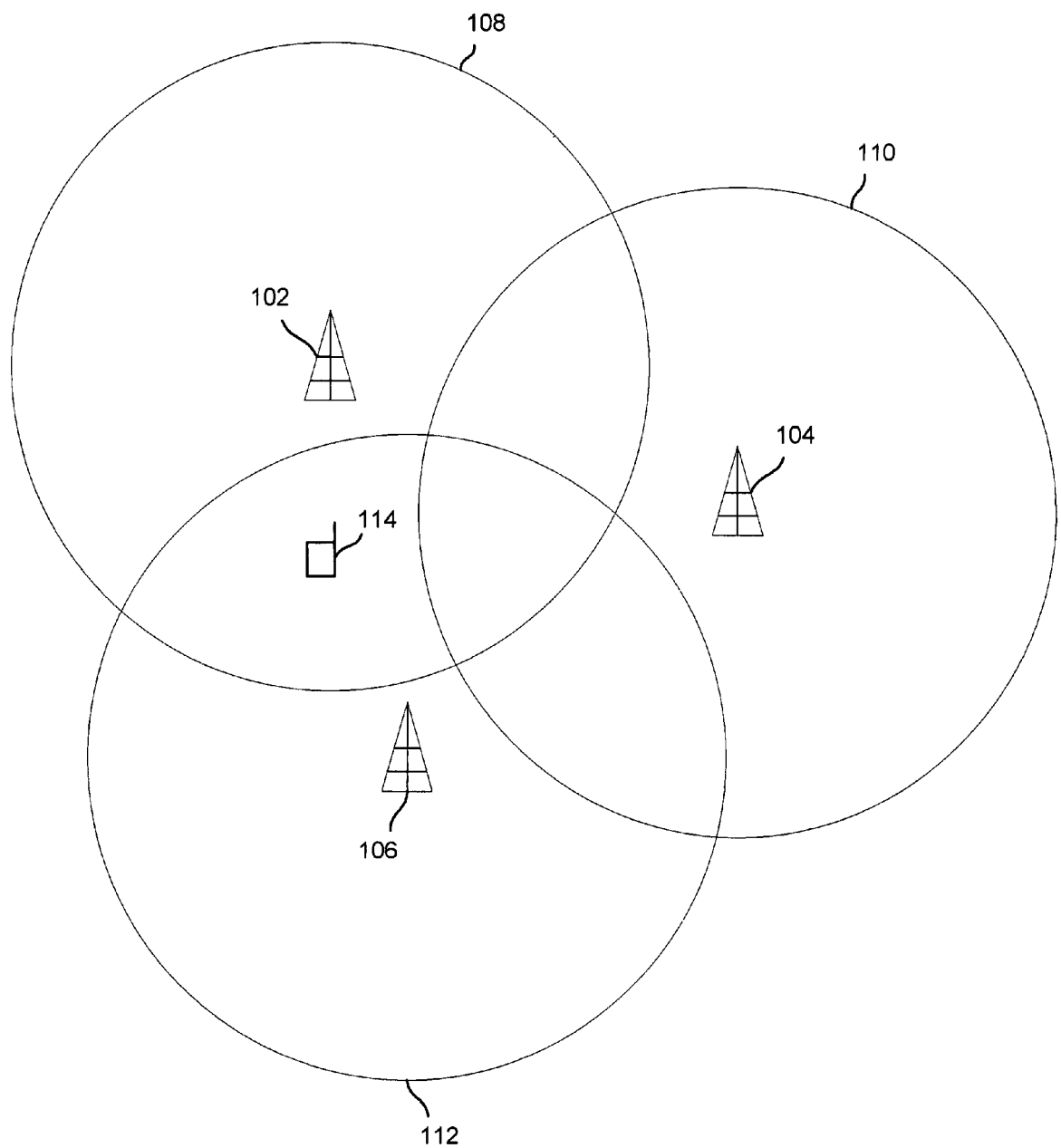
FIG. 1A is a block diagram illustrating an embodiment of a prior art array of base transceiver stations and their associated coverage areas.

FIG. 1A is a block diagram illustrating an embodiment of a prior art array of base transceiver stations and their associated coverage areas. Each of the base transceiver stations (BTS) 102, 104, and 106 has associated with it a corresponding geographic coverage area 108, 110, and 112, respectively, within which its signal is strong enough to be received and used by a mobile station (MS), such as MS 114, to communicate with the core mobile telecommunication network via that BTS.

Figure 1B:
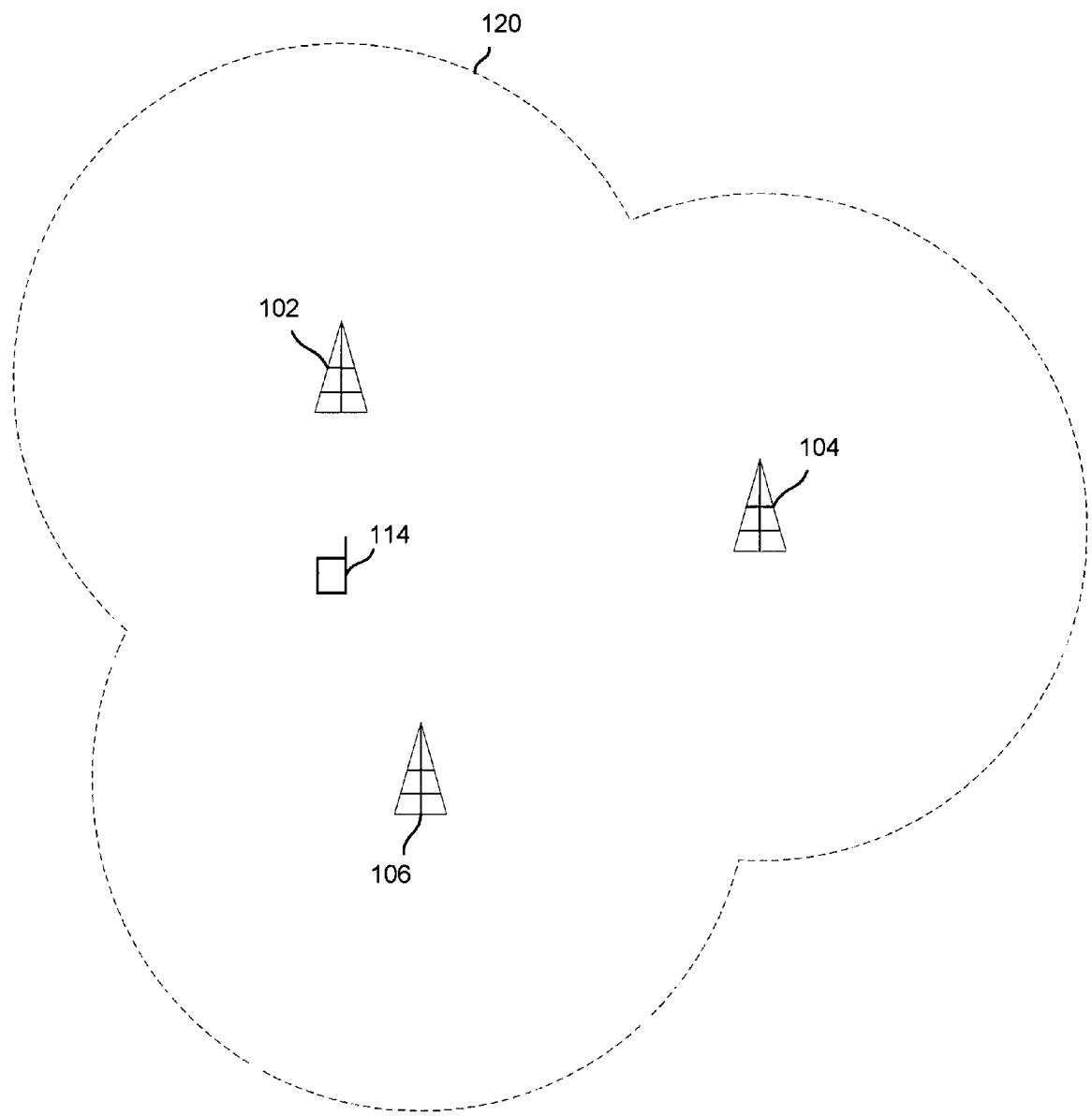
FIG. 1B is a block diagram illustrating an embodiment of a location area within a mobile telecommunications network.

FIG. 1B is a block diagram illustrating an embodiment of a location area within a mobile telecommunications network. In the example shown, the base transceiver stations 102, 104, and 106 are associated with a location area 120. In some embodiments, a location area code (LAC) is associated with and identifies the location area 120. Whether the MS 114 would be permitted to access a GSM or other public land mobile network (PLMN), or other mobile telecommunications network, with which the location area 120 is associate would be determined in some embodiments at least in part on whether a subscriber identification module (SIM) or other identifying data and/or device associated with the MS 114 is authorized to communication via the PLMN or other network within the location area 120, e.g., as determined by checking whether the SIM or other identifying data is associated with a LAC associated with the location area 120, e.g., in a home location register (HLR) and/or other database. Location areas traditionally have been used by mobile service providers to limit a subscriber to using an MS in only certain geographic areas and/or to apply differential billing.

Figure 2:
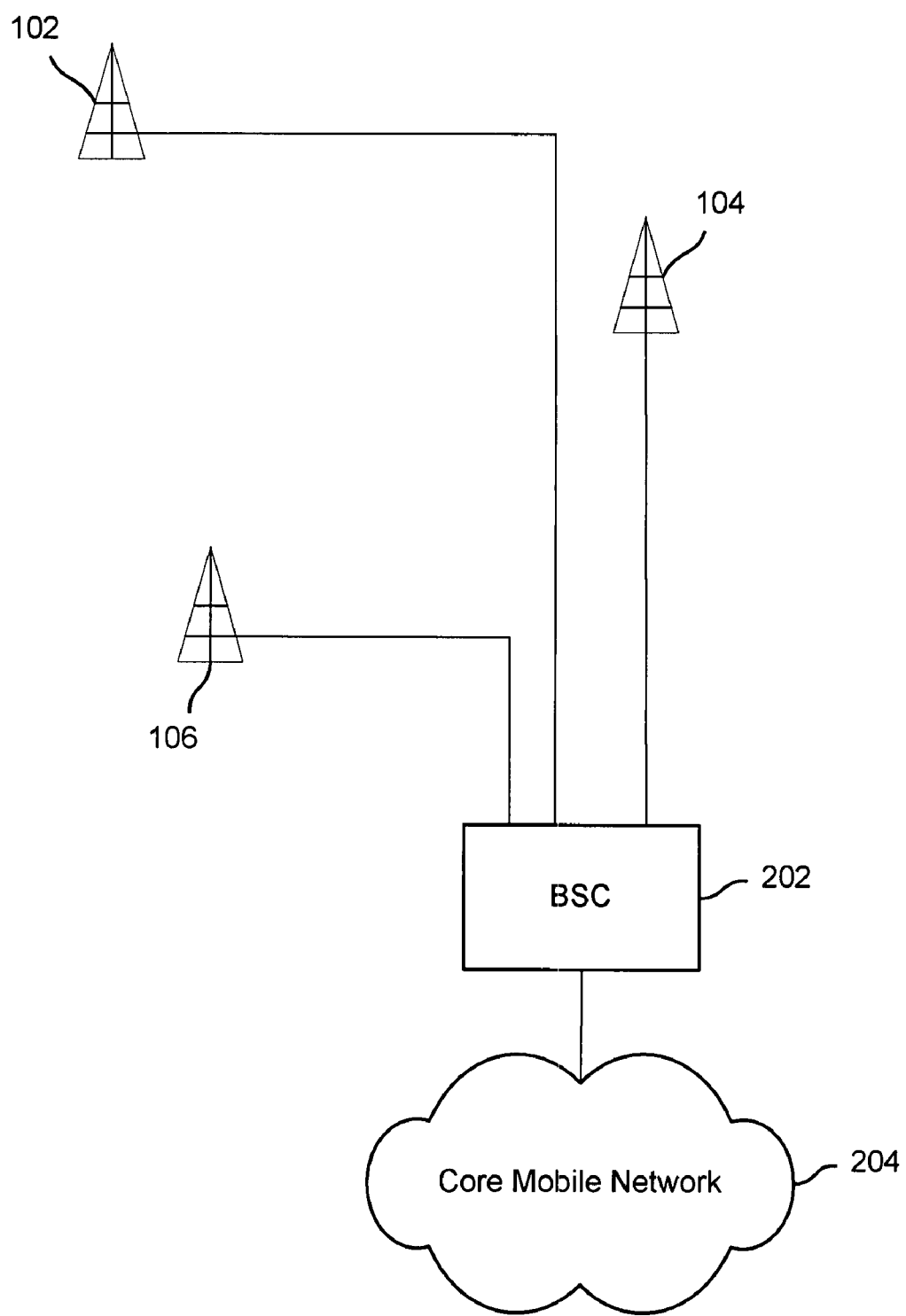
FIG. 2 is a block diagram illustrating an embodiment of base station subsystem (BSS) elements in a typical prior art macrocellular network.

FIG. 2 is a block diagram illustrating an embodiment of base station subsystem (BSS) elements in a typical prior art macrocellular network. In the example shown, the base transceiver stations 102, 104, and 106 of FIG. 1 are shown as each being connected to a base station controller (BSC) 202 via a corresponding dedicated communication link, typically a dedicated T-1/E-1 line. In a GSM network, the dedicated link is known as the Abis interface. The BSC 202 provides access to the core mobile network 204, in a GSM network typically via a mobile switching center (MSC) in the case of voice traffic and control messages and a serving GPRS support node (SGSN) in the case of packet data traffic.

Figure 3:
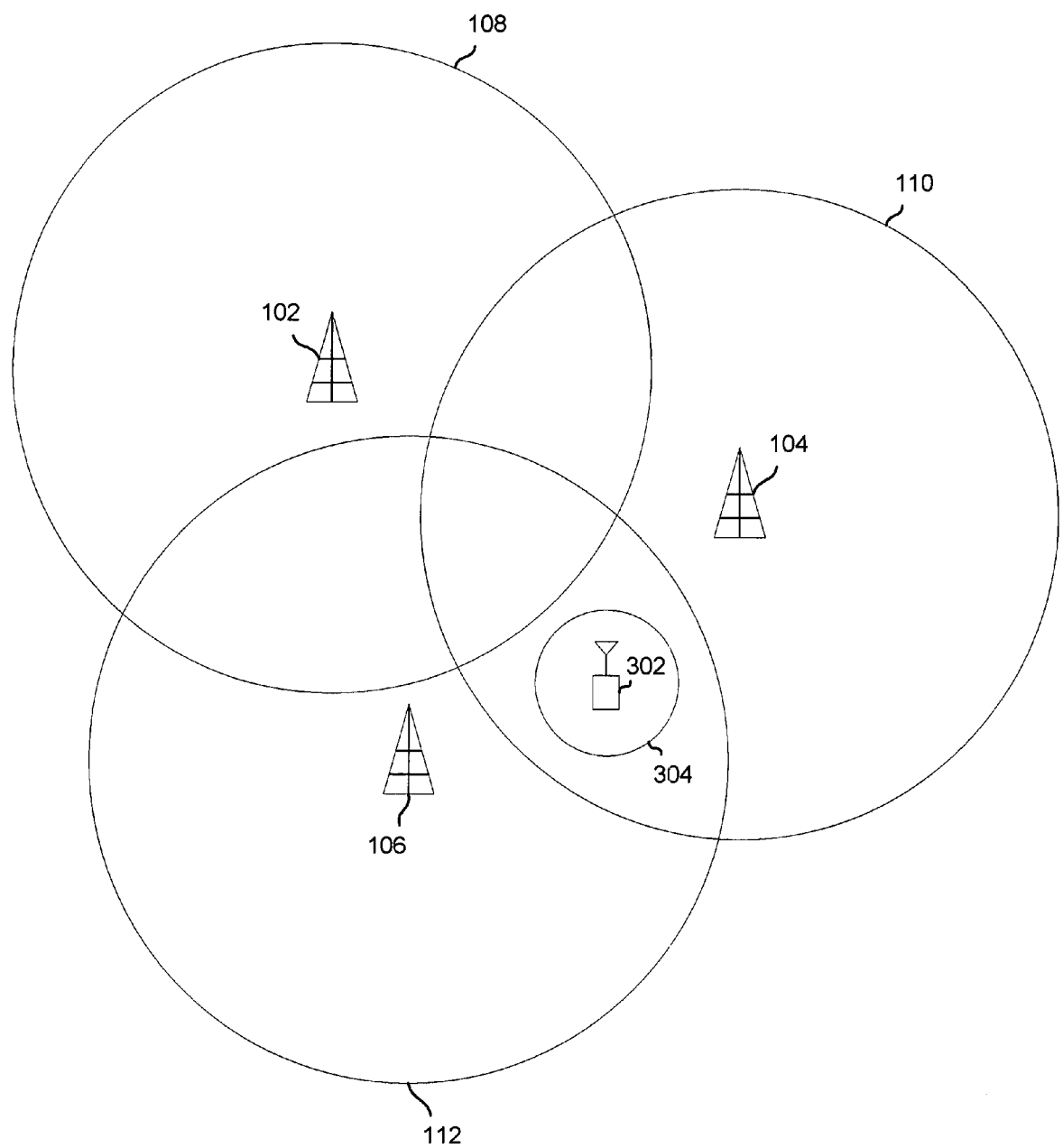
FIG. 3 is a block diagram illustrating an embodiment of a cellular network in which a small scale base transceiver station, such as a micro-, pico-, femto-, or other small scale BTS, has been deployed.

FIG. 3 is a block diagram illustrating an embodiment of a cellular network in which a small scale base transceiver station, such as a micro-, pico-, femto-, or other small scale BTS, has been deployed. In the example shown, a small scale BTS 302 having an associated coverage area 304 has been deployed in the cellular network of FIG. 1, in a location such that a coverage area 304 overlaps with (and in this example, for clarity, is included entirely within) a region in which the coverage area 110 of BTS 104 and the coverage area 112 of BTS 106 overlap. In various embodiments, the small scale BTS 302 may be deployed in a home, office, small business, or other environment, e.g., to provide dedicated and/or lower cost coverage to one or more authorized users associated with the location in which the small scale BTS 302 has been deployed. A small scale BTS is sometimes referred to herein as a "home BTS" or "HBTS", which terms are intended to include any small scale BTS suitable for deployment in a home or other location to provide dedicated coverage to authorized users associated with the location, e.g., persons who live and work in that location and/or authorized visitors, etc.

Figure 4A:
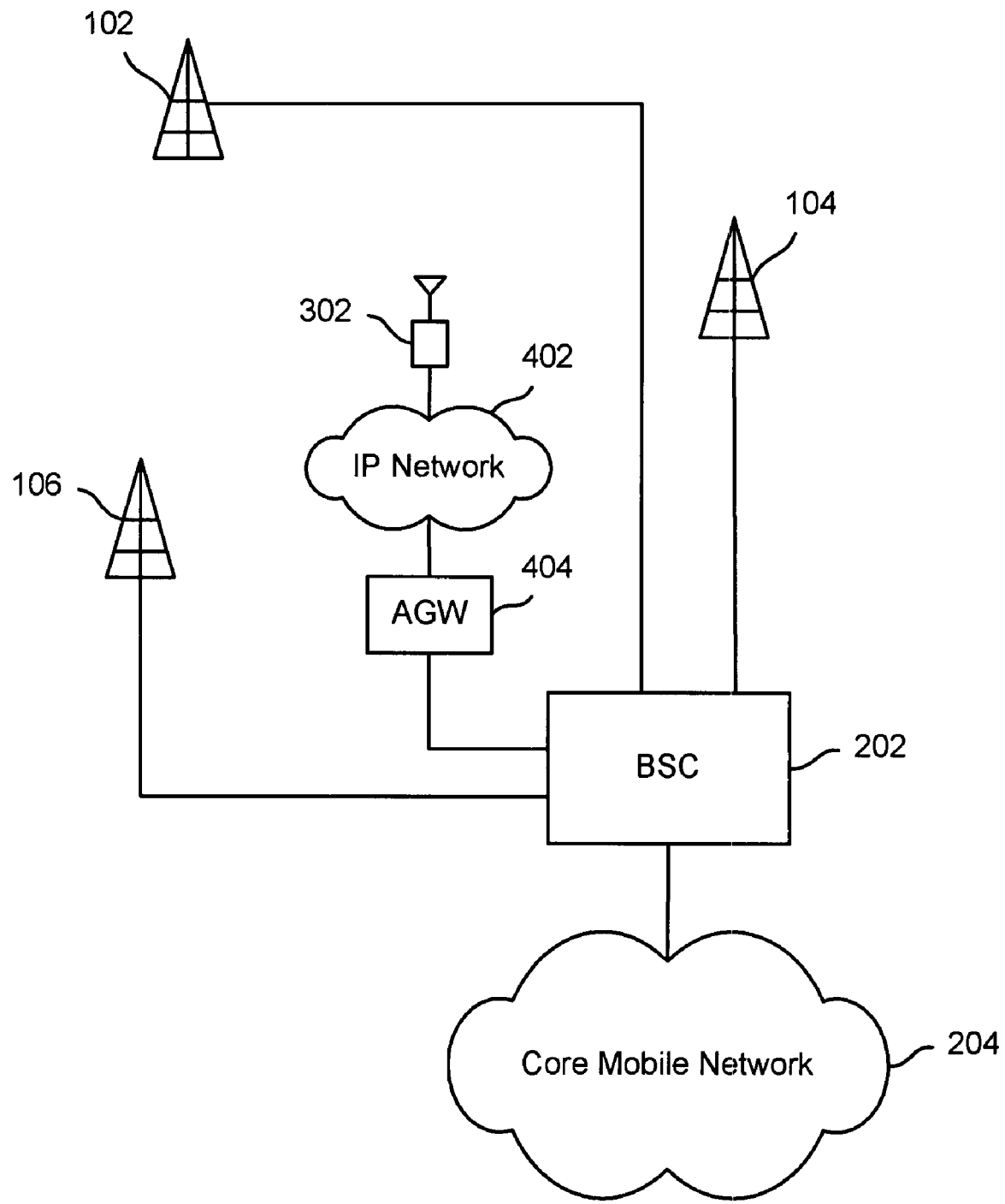
FIG. 4A is a block diagram illustrating an embodiment of a small scale BTS with IP network backhaul.

FIG. 4A is a block diagram illustrating an embodiment of a small scale BTS with IP network backhaul. As noted above, the macro-BTS's 102, 104, and 106 communicate with the core mobile network via a dedicated land line (e.g., T-1/E-1) to a BSC such as BSC 202. In FIG. 4, the small scale BTS 302 of FIG. 3 is shown as being connected to BSC 202 via an IP network 402 and an aggregation gateway (AGW) 404. In some embodiments, AGW 404 is configured to support one or more small scale BTS's such as BTS 302, aggregating their traffic and translating traffic sent via the IP network 402 using a suitable protocol, e.g., the real-time transport protocol (RTP) for voice traffic, to the Abis (for GSM) or similar interface to the BSC (or equivalent node in a non-GSM network), and vice versa. As high-speed Internet access for homes and small businesses becomes more and more ubiquitous, it has become and will continue to become more and more possible to deploy small scale base stations in homes and businesses, and use IP backhaul to provide connectivity to the core mobile network, avoiding the cost and waste of bandwidth that would attend if each such base station required a dedicated T-1/E-1 or other high capacity connection.

Facilitating use by an authorized user of a home or other small scale BTS is disclosed. In some embodiments, an authorized user of an HBTS is attracted to the HBTS when in range of the HBTS. For example, in some embodiments the authorized user of an HBTS automatically updates his/her location to the HBTS when in range of the HBTS. In some embodiments this is accomplished by associating the HBTS with a mobile network code (MNC) or other mobile network identifier that is different than a separate mobile network code associated only with macrocellular base transceiver stations in the same area as the HBTS. In some embodiments, a mobile station associated with an authorized HBTS user is configured to have a PLMN associated with the HBTS-specific MNC as its home PLMN (HPLMN) and/or a highest priority PLMN in its EHPLMN.

The following PLMN related definitions may be found in the 3GPP specifications, for the purposes of PLMN selection, cell selection, cell re-selection and handover. Home PLMN (HPLMN): This is a PLMN where the MCC and MNC of the PLMN identity match the MCC and MNC of the IMSI. Equivalent PLMN: A PLMN contained in the stored list of equivalent PLMNs; these PLMNs are considered equivalent to the selected PLMN regarding PLMN selection, cell selection, cell re-selection and handover. Equivalent HPLMN List: To allow provision for multiple HPLMN codes, PLMN codes that are present within this list shall replace the HPLMN code derived from the IMSI for PLMN selection purposes. The EHPLMN list is stored on the SIM/USIM The EHPLMN list may also contain the HPLMN code derived from the IMSI. If the HPLMN code derived from the IMSI is not present in the EHPLMN list then it shall be treated as a Visited PLMN for PLMN selection purposes. Visited PLMN: This is a PLMN different from the HPLMN (if the EHPLMN list is not present or is empty) or different from an EHPLMN (if the EHPLMN list is present).

When an MS is switched on, it attempts to make contact with a public land mobile network (PLMN). The particular PLMN to be contacted may be selected either automatically or manually. The MS looks for a suitable cell of the chosen PLMN and chooses that cell to provide available services, and tunes to its control channel. This choosing is known as "camping on the cell". The MS will then register its presence in the registration area of the chosen cell if necessary, by means of a location registration, GPRS attach or IMSI attach procedure.

The MS normally operates on its home PLMN (HPLMN) or equivalent home PLMN (EHPLMN). However a visited PLMN (VPLMN) may be selected, e.g., if the MS loses coverage. There are two modes for PLMN selection: automatic mode and manual mode. Automatic mode utilizes a list of PLMNs in priority order. The highest priority PLMN which is available and allowable is selected. In manual mode, the MS indicates to the user which PLMNs are available. Only when the user makes a manual selection does the MS try to obtain normal service on the VPLMN. There are two types of roaming: international and national. In case of international roaming, the MS receives service on a PLMN of a different country than that of the HPLMN. In the case of national roaming, the MS receives service from a PLMN of the same country as that of the HPLMN, either anywhere or on a regional basis. The MS makes a periodic search for the HPLMN while national roaming.

For automatic PLMN selection, the MS selects and attempts registration on other PLMN/access technology combinations, if available and allowable, in the following order:

1. Either the HPLMN (if the EHPLMN list is not present or is empty) or the highest priority EHPLMN (if the EHPLMN list is present).

2. Each PLMN/access technology combination in the "User Controlled PLMN Selector with Access Technology" data file in the SIM (in priority order).

3. Each PLMN/access technology combination in the "Operator Controlled PLMN Selector with Access Technology" data file in the SIM (in priority order).

4. Other PLMN/access technology combinations with received high quality signal in random order.

5. Other PLMN/access technology combinations in order of decreasing signal quality.

For manual PLMN selection, the MS indicates whether there are any PLMNs, which are available using all supported access technologies. This includes PLMNs in the "forbidden PLMNs" list and PLMNs which only offer services not supported by the MS. If displayed, PLMNs meeting the criteria above are presented in the following order:

1. Either the HPLMN (if the EHPLMN list is not present or is empty) or, if one or more of the EHPLMNs are available only the availability of the highest priority EHPLMN is to be presented to the user.

2. PLMN/access technology combinations contained in the "User Controlled PLMN Selector with Access Technology" data file in the SIM (in priority order).

3. PLMN/access technology combinations contained in the "Operator Controlled PLMN Selector with Access Technology" data file in the SIM (in priority order).

4. Other PLMN/access technology combinations with received high quality signal in random order.

5. Other PLMN/access technology combinations in order of decreasing signal quality.

In some embodiments, one or more of the above described SIM data files, and/or one or more other data files on an MS, are modified in the case of an authorized HBTS user to include as an HPLMN or a highest priority PLMN in an EHPLMN list a PLMN associated with an HBTS-specific mobile network code. In some embodiments, for such an MS an appropriate data file is modified such that a separate MNC associated only with one or more macrocellular base transceiver stations (macro-BTS) is included as a VPLMN for that MS. As a result, such an MS of an authorized HBTS user prefers to access the mobile network via the HBTS, but is able to access the mobile network via a macro-BTS (if available) if the HBTS is not available (e.g., the MS is out of range of the HBTS). In some embodiments, over-the-air (OTA) technology is used to update or changes data in a smart card (SIM card or UICC) installed on an MS without having to reissue the card, for example to modify a data file on and/or associated with the card as described above. OTA is based on a client/user architecture where at one end there is an operator back-end system and at the other end there is the smart card. The operator's back-end system sends service requests to an OTA Gateway that transforms the requests into Short Messages to be sent to the smart card.

Figure 4B:
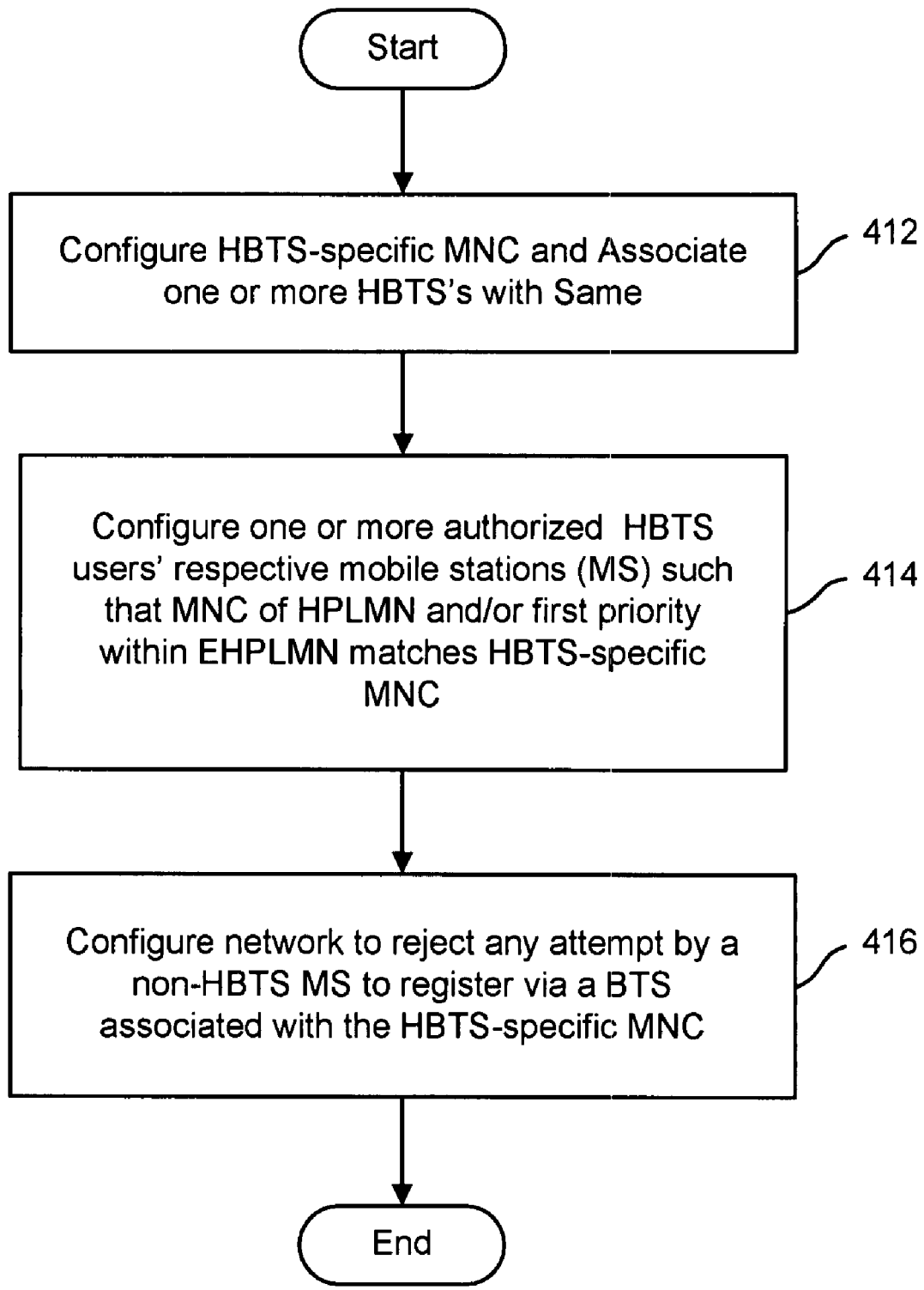
FIG. 4B is a flow chart illustrating an embodiment of a process for facilitating use of one or more restricted base transceiver stations.

FIG. 4B is a flow chart illustrating an embodiment of a process for facilitating use of one or more restricted base transceiver stations. In the example shown, an HBTS-specific MNC is configured and one or more HBTS's are associated with the HBTS-specific MNC (412). One or more authorized HBTS users' respective mobile stations (MS) are configured such that the MNC of the HPLMN and/or a first priority PLMN in the EHPLMN list matches the HBTS-specific MNC (414). The mobile network is configured to reject any attempt by a non-HBTS MS to register via a BTS associated with the HBTS-specific MNC (416). In some embodiments, non-HBTS users are prevented from registering with (updating their location to) an HBTS by configuring the MS of a non-HBTS user to include a PLMN associated with the HBTS-specific MNC in a list of PLMN's the MS is prohibited to use as a visiting user (prohibited VPLMN). The process of FIG. 4B results in a mobile network operator's (MNO) subscribers being divided into at least two groups, a first group (non-HBTS users) who are prevented from accessing the mobile network via an HBTS associated with the HBTS-specific MNC and a second group (HBTS users) the MS's of which are attracted to an HBTS associated with the HBTS-specific MNC, when in range of such an HBTS.

In some embodiments, using an HBTS-specific MNC to cause a MS to access a mobile network via an HBTS, when available, and via a macro-BTS only when no HBTS the user is authorized to use is available is combined with one or more techniques for limiting an HBTS user to using only a subset of HBTS's associated with an HBTS-specific MNC, e.g., to that subset of one or more HBTS's of which that particular user is an authorized user (e.g., one in his/her home or office). In some embodiments, non-HBTS (macro-cell only) users are prevented from using any HBTS.

Figure 4C:
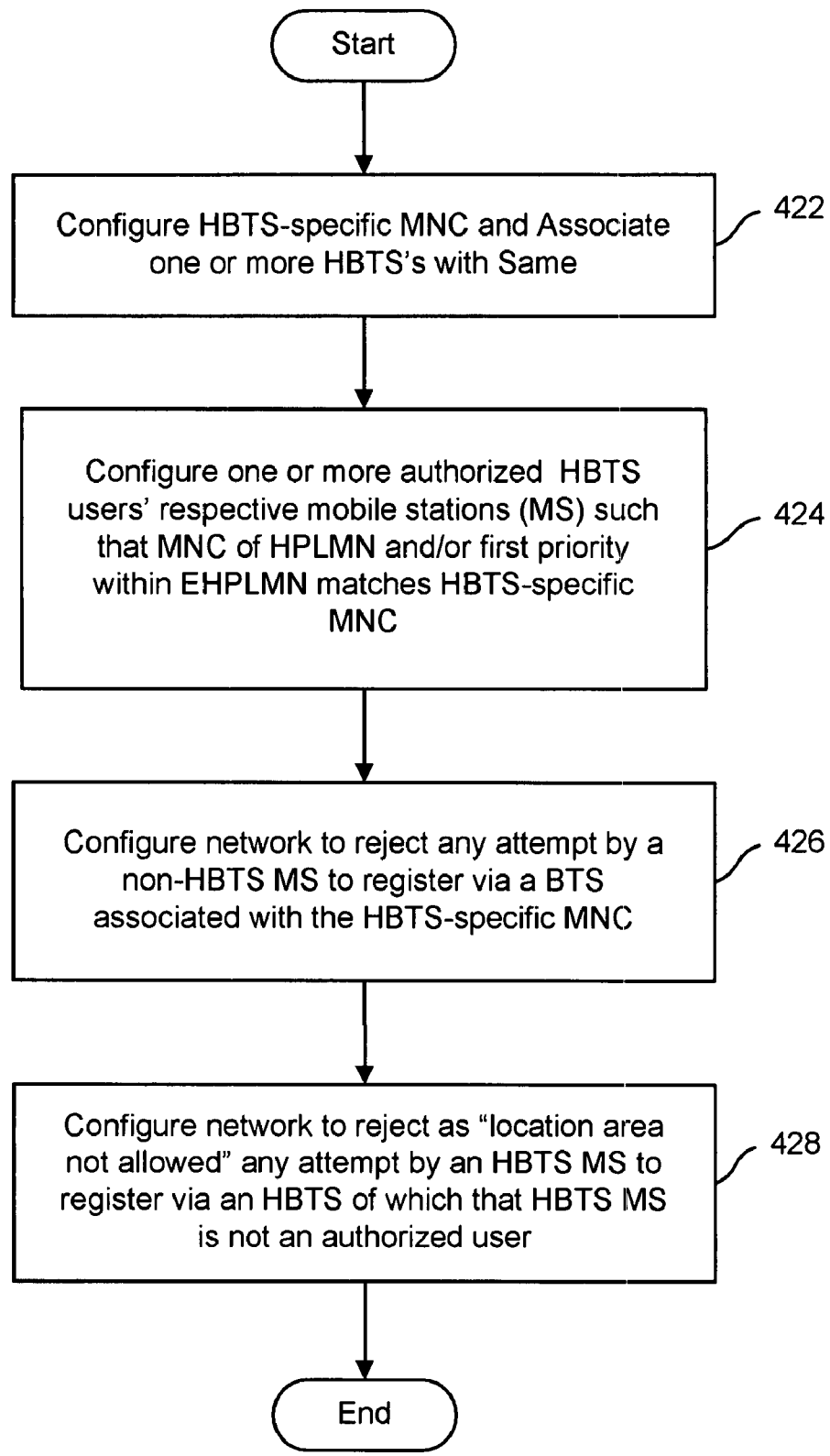
FIG. 4C is a flow chart illustrating an embodiment of a process for facilitating use of a set of restricted base transceiver stations by a group of restricted base transceiver station users while restricting each member of the group to using those restricted base transceiver stations that member is authorized to use.

FIG. 4C is a flow chart illustrating an embodiment of a process for facilitating use of a set of restricted base transceiver stations by a group of restricted base transceiver station users while restricting each member of the group to using those restricted base transceiver stations that member is authorized to use. In the example shown, steps 422-426 are the same as 412-416 of FIG. 4A. In addition, the mobile network is configured to reject any attempt by an MS associated with an HBTS-user (i.e., one associated with the HBTS-specific MNC) to register via (update location to) an HBTS of which that HBTS user is not an authorized user (e.g., because the HBTS user is associated with the HBTS-specific MNC by virtue of being associated with and an authorized user of an HBTS other than the HBTS with which the MS is trying to register) (428). In the example shown, the network is configured to provide "location area not allowed" as a reason for rejecting the location update. For each HBTS and/or group of HBTS's having the same set of one or more authorized users, a separate location area (LA) and associated location area code (LAC) is configured, and only HBTS-users authorized to use that particular HBTS are associated by the network with that LAC.

Figure 4D:
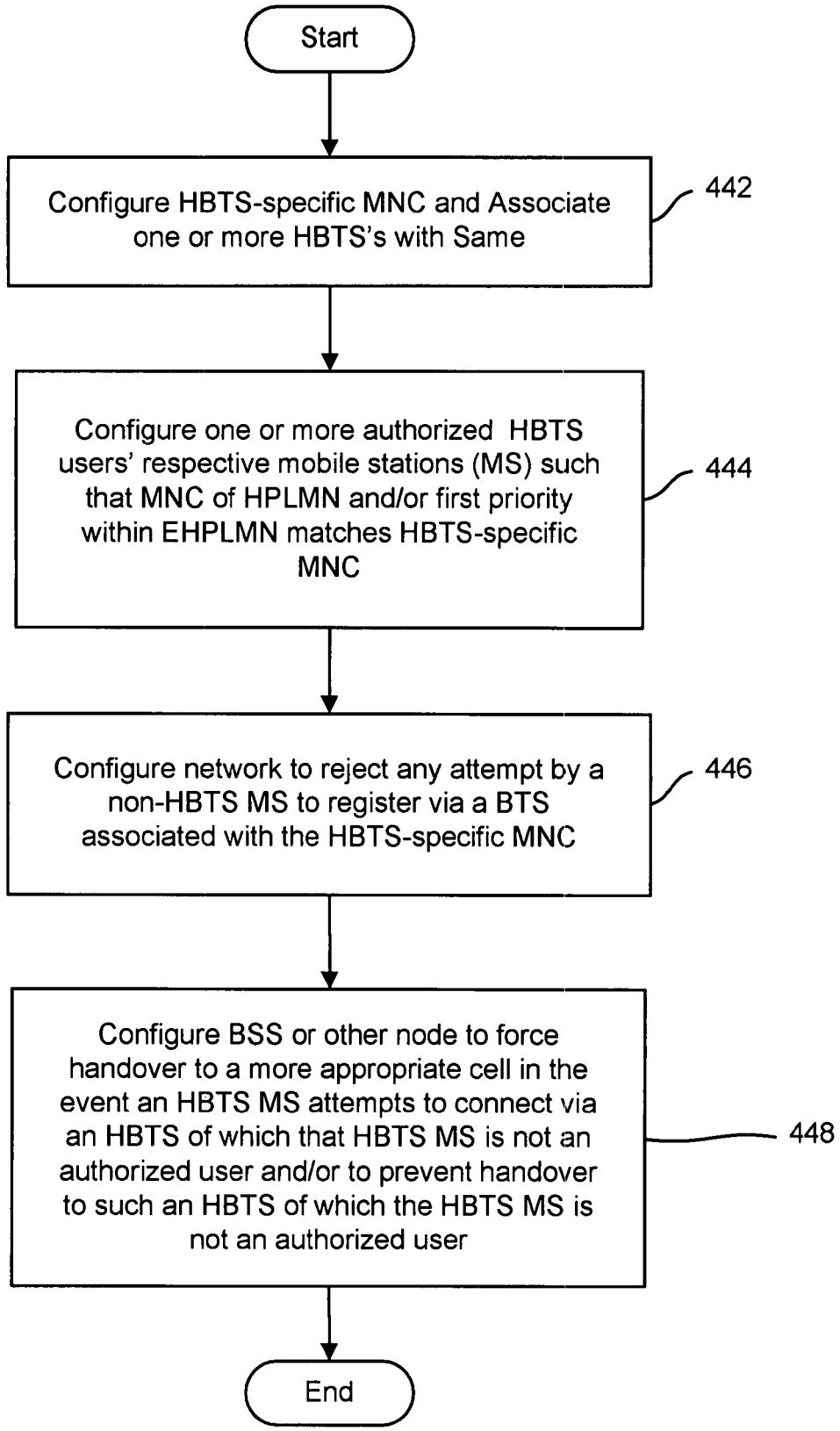
FIG. 4D is a flow chart illustrating an embodiment of a process for facilitating use of a set of restricted base transceiver stations by a group of restricted base transceiver station users while restricting each member of the group to using those restricted base transceiver stations that member is authorized to use.

FIG. 4D is a flow chart illustrating an embodiment of a process for facilitating use of a set of restricted base transceiver stations by a group of restricted base transceiver station users while restricting each member of the group to using those restricted base transceiver stations that member is authorized to use. In the example shown, steps 442-446 are the same as 412-416 of FIG. 4A. In addition, a BSS or other node, for example a BSC, is configured to force an MS associated with an HBTS user who is not authorized to use a particular HBTS to which the MS has updated its location (e.g., after being allowed to do so by virtue of being associated with an HBTS-specific MNC with which the HBTS is associated) to be handed over to a more appropriate cell (e.g., a macro-BTS or an HBTS of which the HBTS user is an authorized user, if available) in the event a call or other communication is attempted to be established with the MS via the HBTS of which is it not an authorized user and/or to prevent such an MS being handed over to such an HBTS of which the MS is not an authorized user, notwithstanding the fact that the MS is associated with an HBTS-specific MNC with which the HBTS of which the MS is not an authorized user is associated (448).

Figure 4E:
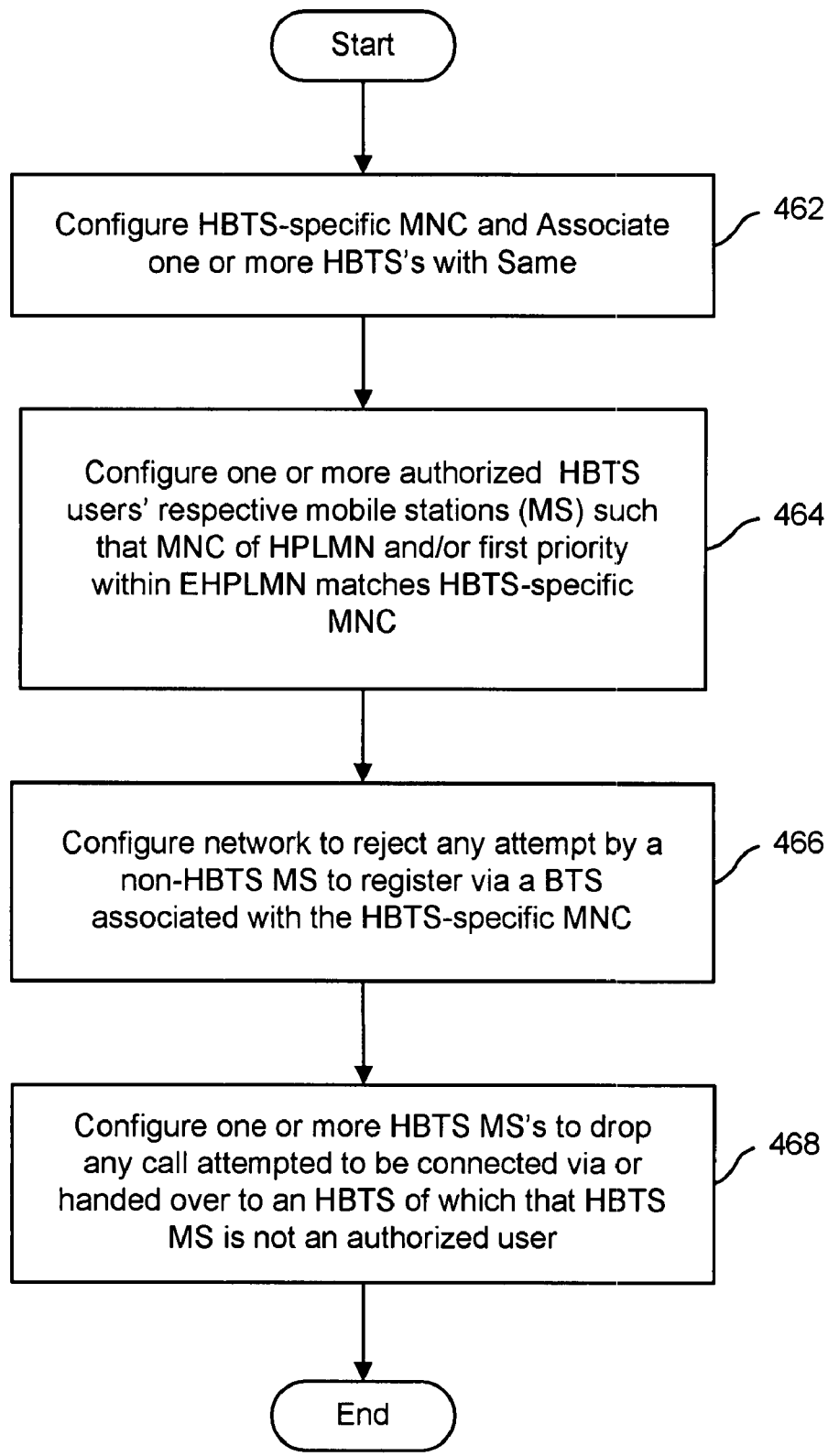
FIG. 4E is a flow chart illustrating an embodiment of a process for facilitating use of a set of restricted base transceiver stations by a group of restricted base transceiver station users while restricting each member of the group to using those restricted base transceiver stations that member is authorized to use.

FIG. 4E is a flow chart illustrating an embodiment of a process for facilitating use of a set of restricted base transceiver stations by a group of restricted base transceiver station users while restricting each member of the group to using those restricted base transceiver stations that member is authorized to use. In the example shown, steps 462-466 are the same as 412-416 of FIG. 4A. In addition, an MS of an HBTS user is configured to drop any call that is connected or attempted to be connected via an HBTS of which the MS is not an authorized user (468).

The processes of FIGS. 4C-4E describe a variety of ways in which a subset of subscribers who are HBTS users can be attracted to an HBTS, if present, but only allowed to access the mobile network through such an HBTS if the user is an authorized user of the particular HBTS to which the user's MS has been attracted (e.g., by virtue of having as its HPLMN or highest priority EHPLMN a PLMN associated with a HBTS-specific MNC). In some embodiments, one or more of the techniques described in connection with FIGS. 4C-4E is/are used to prevent non-HBTS users (i.e., macro-cell only users) from using any HBTS.

The below figures and accompanying description provide further details regarding how access to a mobile network via a particular HBTS, e.g., one of a plurality of HBTS's associated with an HBTS-specific MNC, is limited in various embodiments to an authorized subset of HBTS and/or other users.

Figure 5:
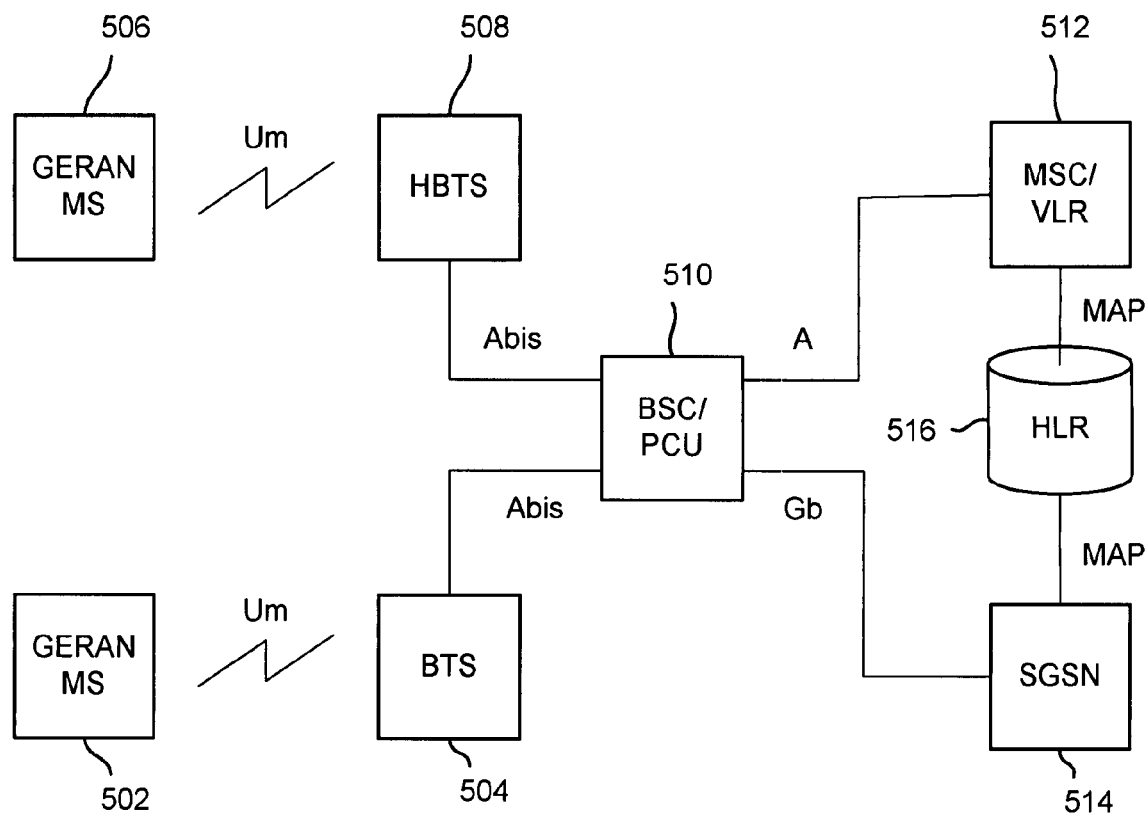
FIG. 5 is a block diagram illustrating an embodiment of a mobile network that includes both macro- and small scale base transceiver stations.

FIG. 5 is a block diagram illustrating an embodiment of a mobile network that includes both macro- and small scale base transceiver stations. In the example shown, a GSM edge radio access network (GERAN) mobile station (MS) 506 is shown communicating via an air (Um) interface to an HBTS 508, which communicates over an Abis interface (e.g., via an IP or other network, not shown in FIG. 5) with a base station controller (BSC)/packet control unit (PCU) 510. A GERAN MS 502 similarly is shown communicating via the Um air interface with a macro-BTS 504, which also communicates via the Abis interface with BSC/PCU 510. BSC/PCU 510 in turn provides connectivity via the A interface to a mobile switching center (MSC) 512 for voice communications and related signaling and via the Gb interface to a serving GPRS support node (SGSN) 514 for non-voice (packet) data. The MSC 512 and SGSN 514 each communicate with a home location register (HLR) 516 via a mobile application part (MAP) interface. In some embodiments, the HLR 516 comprises data associated with each of one or more location areas a set of one or more users and/or mobile stations authorized to access the mobile network via a base transceiver associated with that location area. In some embodiments, the MS is identified by a subscriber identity module (SIM) included in and associated at the HLR with the MS, and an MS is allowed to access the mobile network only through base transceivers associated with the location area(s) associated with location area codes (LAC) with which the mobile station's SIM has been associated at the HLR 516.

Figure 6:
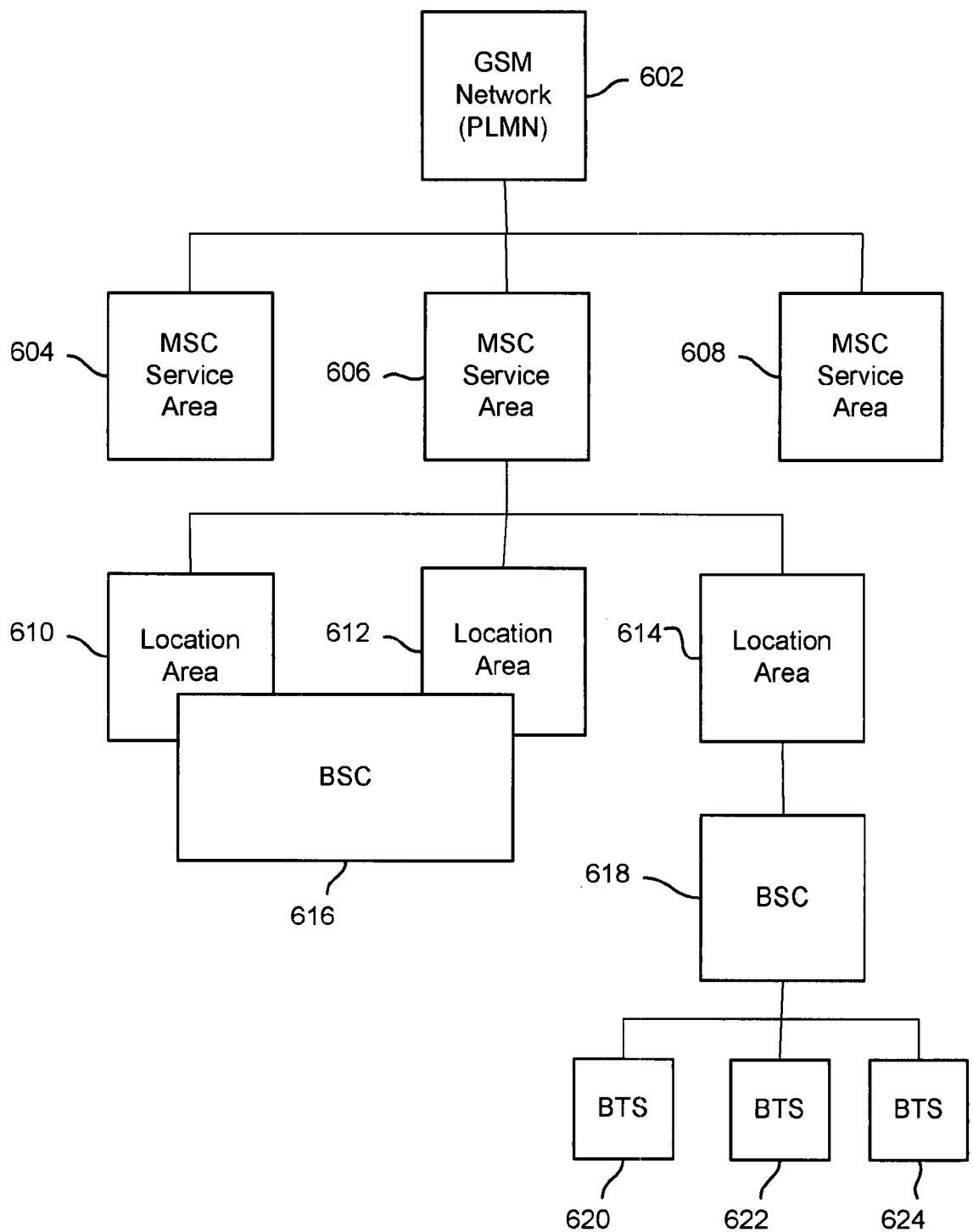
FIG. 6 is a block diagram illustrating an embodiment of a hierarchy of location and/or service areas.

FIG. 6 is a block diagram illustrating an embodiment of a hierarchy of location and/or service areas. A GSM or other public land mobile network (PLMN) 602 is shown in this example as being divided into a plurality of MSC service areas represented in FIG. 6 by MSC service areas 604, 606, and 608. Each MSC service area has one or more location areas associated with it, as represented in FIG. 6 by the location areas 610, 612, and 614 shown as being associated with MSC service area 606. A BSC may be associated with one or more location areas. In the example shown, BSC 616 is associated with location areas 610 and 612, while BSC 618 and base transceiver stations 620, 622, and 624 associated therewith are associated with location area 614. In some embodiments, base transceiver stations 620, 622, and 624 correspond to BTS 102, 104, and 106 of FIGS. 1A and 1B and location area 614 corresponds to location area 120 of FIG. 1B.

Controlling (limiting) access to a mobile network via an HBTS or other small scale BTS to a subset of a service provider's users who ire included in a set of one or more authorized users of the HBTS or other small scale BTS is disclosed. In some embodiments, user who are customers of a mobile service provider with which an HBTS is associated but who are not authorized to access the service provider's network via that HBTS are not allowed to access the mobile network through that HBTS. Limiting mobile access via an HBTS to a subset of one or more mobile network users by defining for the HBTS (and in some embodiments zero, one, or more other HBTS's) a dedicated location area with which only the subset of users is associated is disclosed. In some embodiments, multiple HBTS's in one or more geographic areas are associated with an HBTS-specific location area with which HBTS-authorized users are associated but non-HBTS users are not. In some embodiments, the foregoing approach allows any user who has paid to install and/or otherwise have access via an HBTS to access the network via his/her own or any other HBTS included in the HBTS-specific location area. In various embodiments, an HBTS-specific location area may overlap partly, entirely, or not at all with one or more other location areas, e.g., traditional macrocellular network location areas associated with one or more macro-BTS's.

Figure 7:
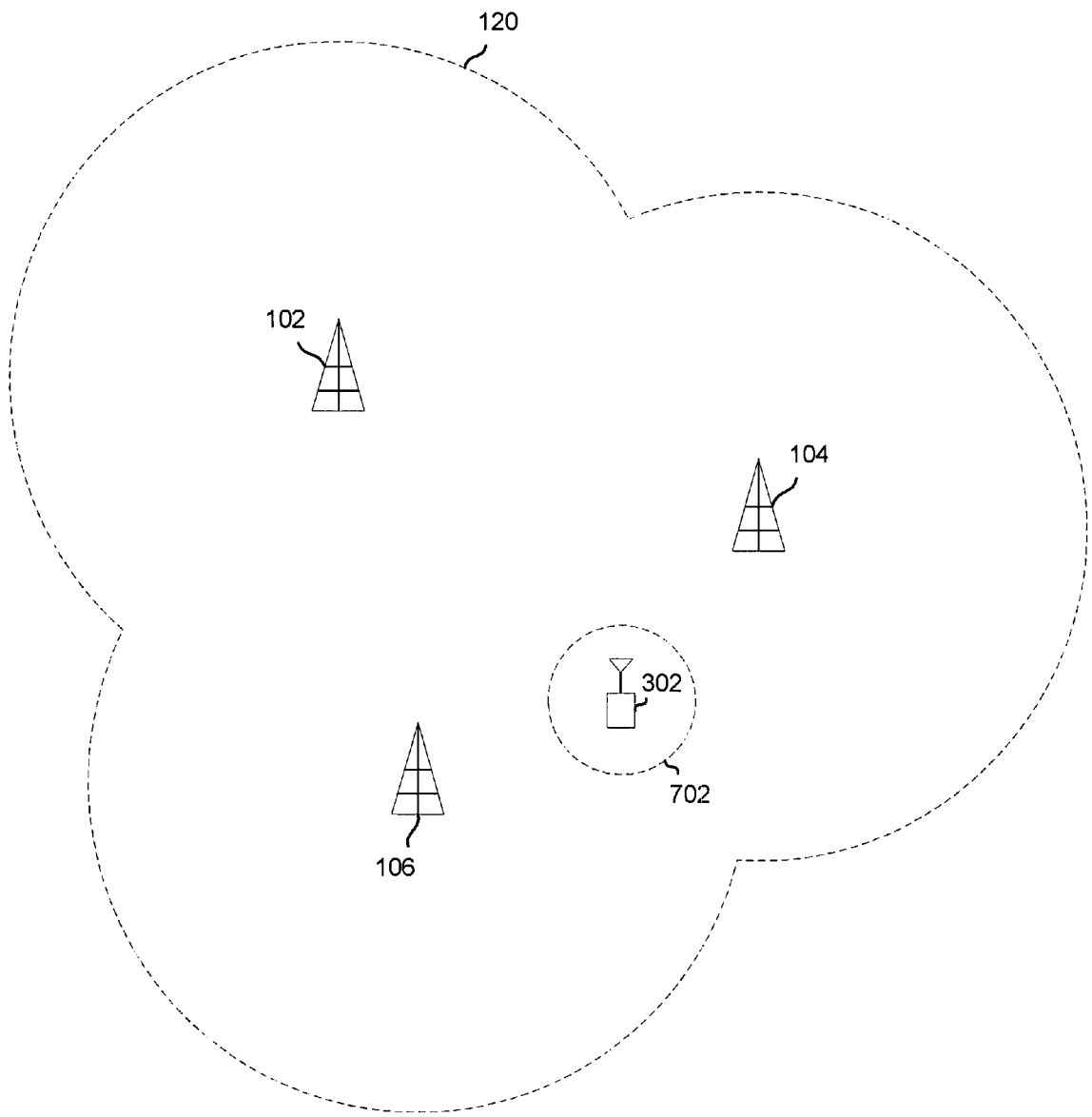
FIG. 7 is a block diagram illustrating an embodiment of a system for controlling access to a mobile network via an HBTS or other small scale BTS.

FIG. 7 is a block diagram illustrating an embodiment of a system for controlling access to a mobile network via an HBTS or other small scale BTS. In the example shown, small scale BTS 302 is shown as being associated with an HBTS-specific location area 702. The HBTS-specific location area 702 is accessible by mobile users that are both within a coverage area of HBTS 302 and associated with the HBTS-specific location area 702. Other users of a mobile network with which HBTS 302 and macro-BTS's 102, 104, and 106 are associated, i.e., those not authorized to access the network via HBTS 302, are not permitted to access the mobile network via HBTS 302 even while within the coverage area of HBTS 302, because the network is configured to refuse such users' attempts to register (i.e., perform a "location update") to obtain access/service via the HBTS 302 as a consequence of their not being associated with (e.g., at the HLR) the HBTS-specific location area 702. Instead, in the example shown such users would in some embodiments continue to access the mobile network, if available, via one of the macro-BTS's 102, 104, and/or 106 (assuming the user is associated with the macrocellular location area 120).

Figure 8:
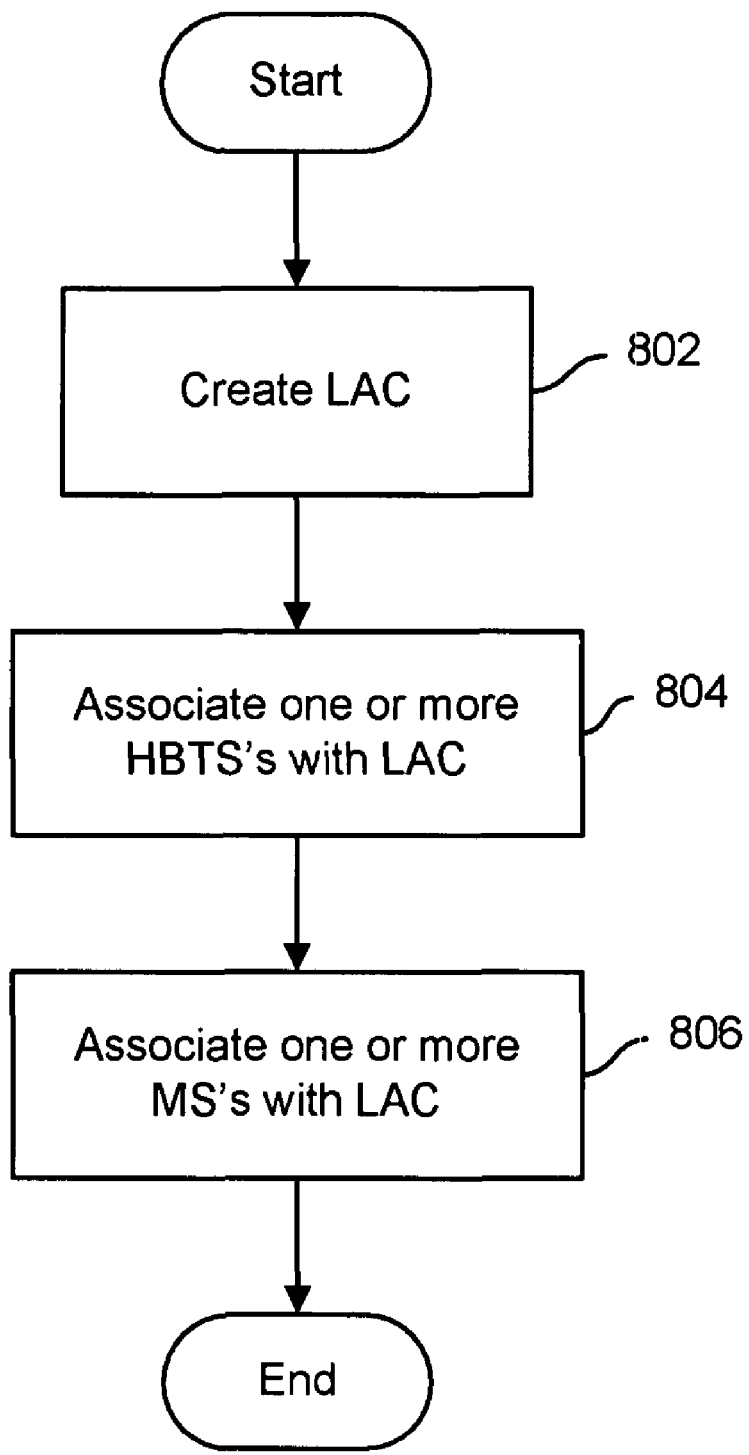
FIG. 8 is a flow chart illustrating an embodiment of a process for controlling access to a mobile network.

FIG. 8 is a flow chart illustrating an embodiment of a process for controlling access to a mobile network. In the example shown, a location area and associated location area code (LAC) are defined, e.g., by establishing appropriate data structures and/or fields in an HLR and/or other database (802). One or more HBTS's is/are associated with the LAC (804), e.g., by entering identifying data in appropriate data fields. One or more mobile stations (MS) are associated with the LAC (806). For example, for each MS to be associated with the HBTS-specific LAC, an IMSI or other identifier associated with the MS is associated, e.g., at the HLR, with the HBTS-specific LAC.

Figure 9:
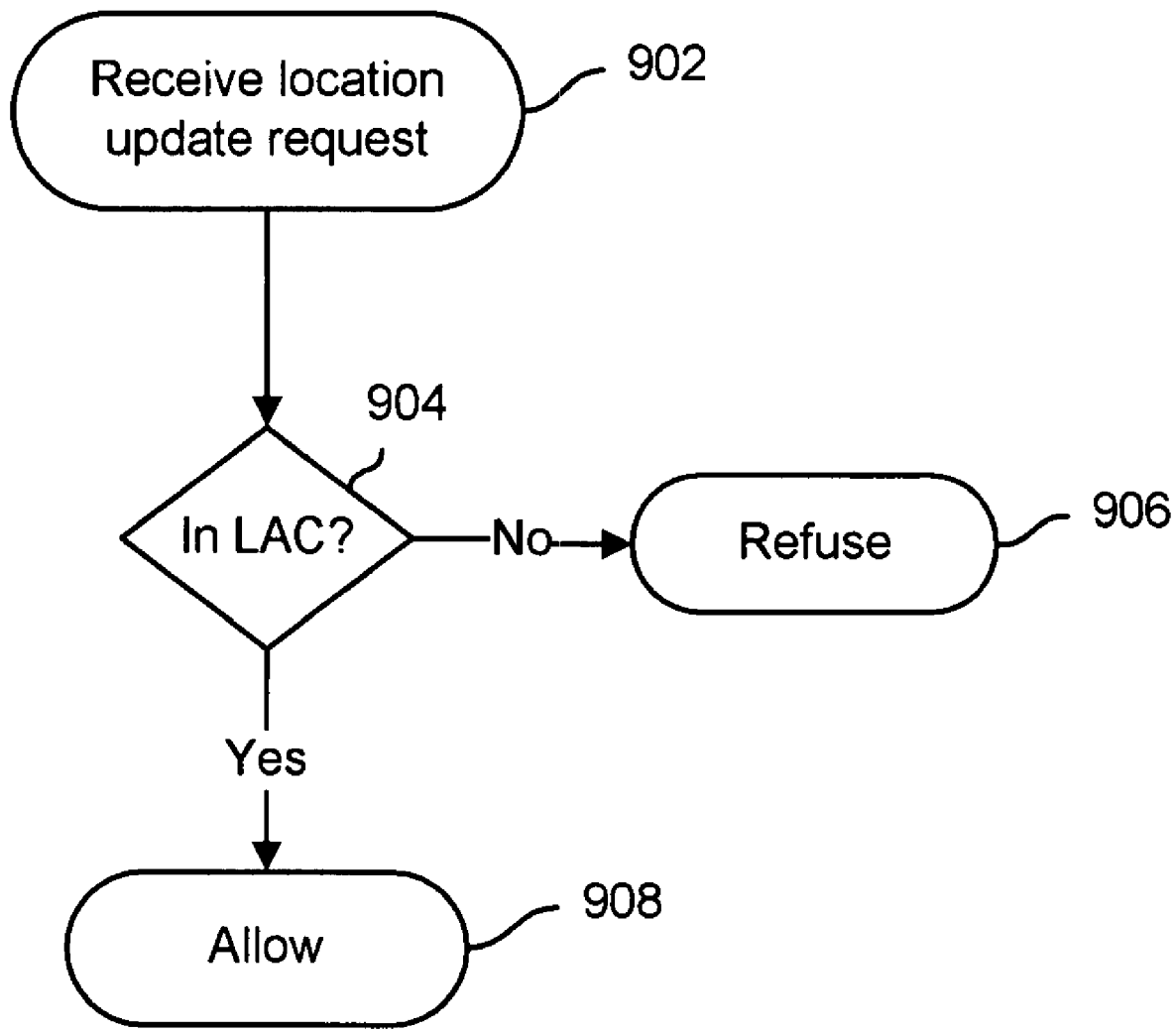
FIG. 9 is a flow chart illustrating an embodiment of a process for controlling access to a mobile network.

FIG. 9 is a flow chart illustrating an embodiment of a process for controlling access to a mobile network. In some embodiments, the process of FIG. 9 is implemented at a mobile switching center (MSC), HLR, and/or other core network element. In the example shown, a location update request is receive (902), e.g., via an HBTS. It is determined whether a mobile station (MS) from which the location update request was received is authorized to access the network via that HBTS, in this example by determining whether an IMSI or other identifier associated with the MS is associated (e.g., at the HLR) with an HBTS-specific LAC or other location area identifier with which the HBTS is associated (904). If it is determined that the MS is not associated with an HBTS-specific LAC with which the HBTS is associated (904), the location update request is refused (906). Conversely, if it is determined that the MS is associated with the HBTS-specific LAC (904), the location update request is allowed (908), enabling the MS to access the mobile network via the HBTS.

Configuring a base station subsystem (BSS) element, such as a BSC, or some other node to limit access via an HBTS to a subset of subscribers which are associated with that HBTS—e.g., rather than or in addition to limiting access to subscribers and/or MS's associated with an HBTS-specific location area—is disclosed. In some embodiments, a BSC or other node is configured to determine, e.g., based on the IMSI or another identifier associated with an MS, whether a particular MS is authorized to access the network via an HBTS via which the subscriber is attempting to access the network. If not, the BSC or other node in various embodiments forces a handover to a more appropriate BTS, such as a macro-BTS, if available, and/or drops/blocks the call.

Figure 10:
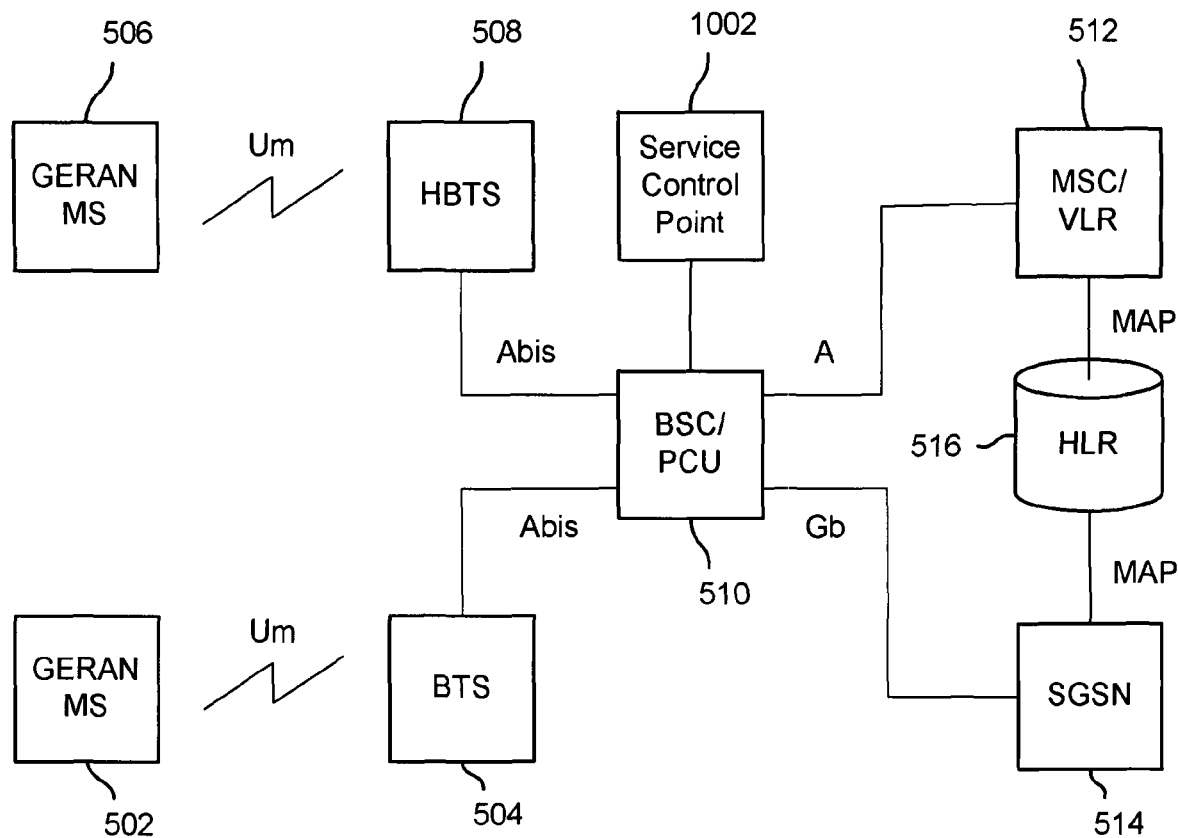
FIG. 10 is a block diagram illustrating an embodiment of a system for controlling access to a mobile network via an HBTS.

FIG. 10 is a block diagram illustrating an embodiment of a system for controlling access to a mobile network via an HBTS. In the example shown, a service control point 1002 has been added to the elements shown in FIG. 5. While shown in FIG. 5 as a separate element, in some embodiments the service control point 1002 is implemented as an element internal to BSC/PCU 510. In some embodiments, service control point 1002 includes a database which identifies, e.g., by IMSI, those MS's that are authorized to access the mobile network via an HBTS associated with the BSC 510, such as HBTS 508 in the example shown. Logic implemented on BSC 510 and/or service control point 1002 determines the IMSI or other identifier associated with an MS accessing or attempting to access the mobile network via the HBTS, determines whether such access by that particular MS via the HBTS is authorized, and if not forces a handover to a more appropriate cell, if available.

In various embodiments, one or more of the following techniques are used by the BSC or other BSS component to determine the IMSI of the MS: the Common ID procedure of BSS Application Part (BSSAP); in case of downlink packet transfer, the IMSI is provided in the downlink LLC PDUs received from the SGSN via BSS GPRS Protocol (BSSGP); in case of uplink packet transfer, the Radio Access Capability Update procedure of BSSGP can be used by the BSS to request the IMSI of the MS; the IMSI may be requested from the MS, directly or indirectly, by sending an encrypted PROVIDE IDENTITY REQUEST, for IMSI, to the MS, sending a PROVIDE IDENTITY REQUEST, for IMEI, to the MS and obtaining the IMSI a table mapping IMSIs & IMEIs, and/or the TMSI of the MS is obtained by sniffing MM messages and the MAP-G interface with the VLR is used to obtain the IMSI; and release 6 of 3GPP provides the option of including the MS IMSI in the PROVIDE LOCATION REQUEST message sent from the Core Network to the BSC/PCU/SMLC.

Figure 11:
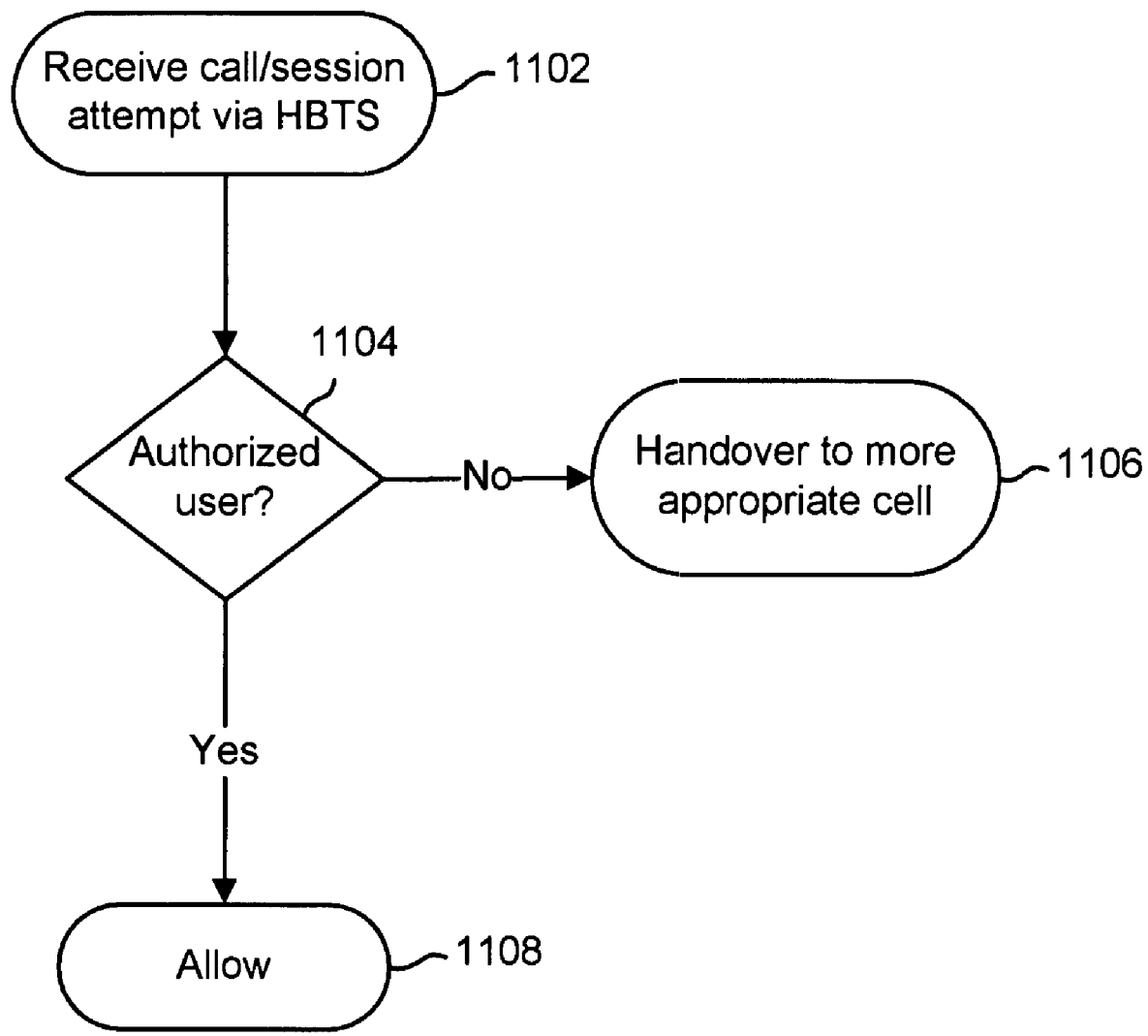
FIG. 11 is a flow chart illustrating an embodiment of a process for controlling access to a mobile network.

FIG. 11 is a flow chart illustrating an embodiment of a process for controlling access to a mobile network. In some embodiments, the process of FIG. 11 is implemented on a BSC or other BSS node. An attempt to establish a call or other session via an HBTS is received (1102). For example, an MS that has updated its location to an HBTS, but which is not authorized to use the HBTS to place or receive calls, etc., attempts to originate a call; or a call such an MS is attempted to be terminated with the MS via the HBTS. It is determined whether the MS is associated with an authorized use of the HBTS (1104). If not, a handover to a more appropriate cell, e.g., a macro-BTS, if available, is forced (1106). If the MS is determined to be authorized to access the network via the HBTS, the call is processed normally (1108).

Figure 12:
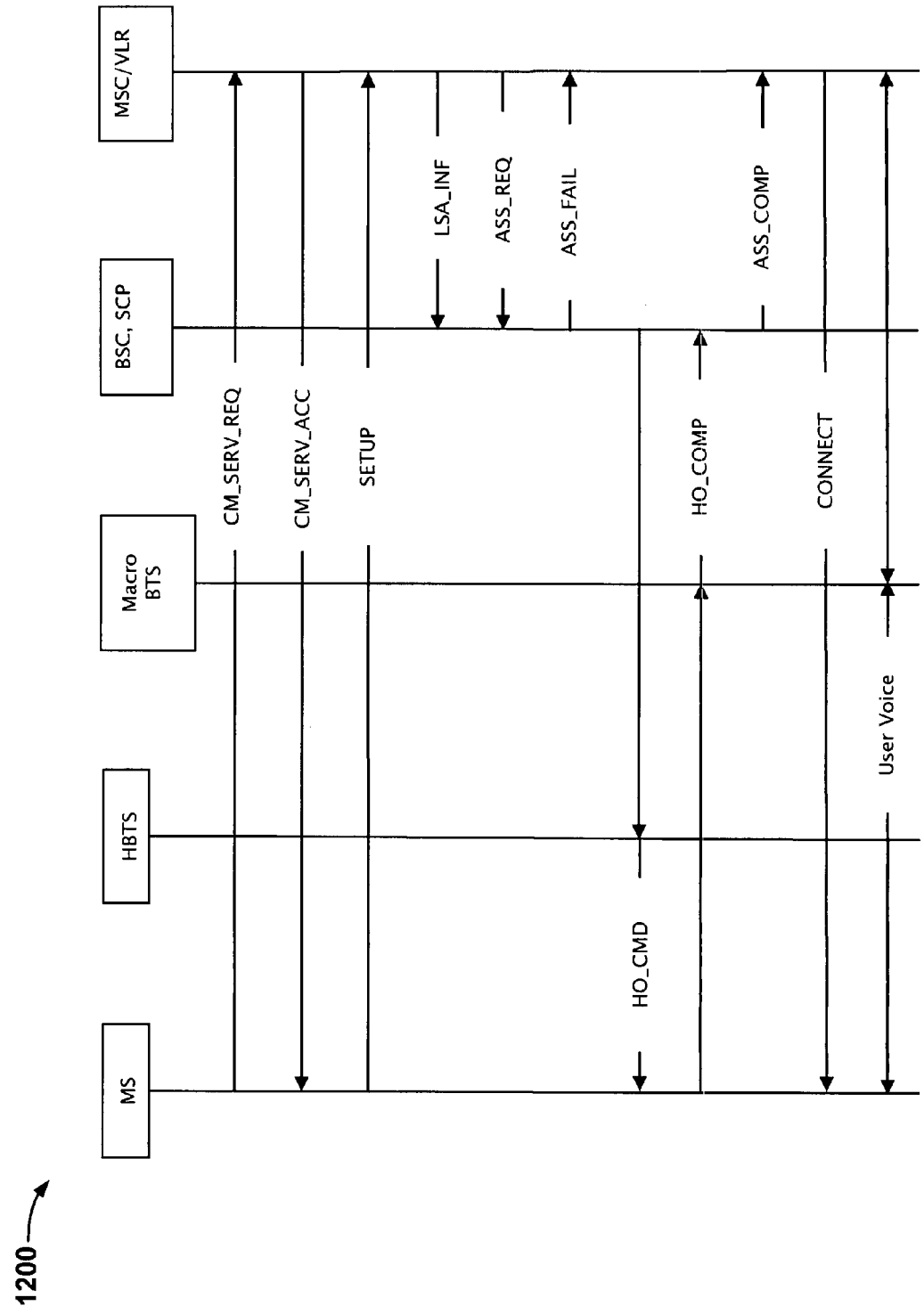
FIG. 12 is a call flow diagram illustrating an embodiment of a process for controlling access to a mobile network in the case of a mobile originated call attempted to be made via an HBTS by a user not authorized to use the HBTS for that purpose.

FIG. 12 is a call flow diagram illustrating an embodiment of a process for controlling access to a mobile network in the case of a mobile originated call attempted to be made via an HBTS by a user not authorized to use the HBTS for that purpose. Upon observing an attempt by the unauthorized MS to originate a call, in the example call flow 1200 the BSC sends to the MS a handover command ("HO_CMD") message instructing the MS to complete a handover to a macro-BTS. Upon receiving a handover complete ("HO_COMP") message from the MS, via the macro-BTS, the BSC allows the call to be established. In some embodiments, the MSC does not send local security association (LSA) information to the BSC, as shown in FIG. 12, and instead the BSC or another BSS component is configured to determine whether the MS is authorized to use the HBTS or not. In some embodiments, the BSC or other BSS component obtains the IMSI of the MS (e.g., either on its own or via the MSC/VLR) and uses the IMSI to query an authorization database. In some embodiments, the BSC or other BSS component is provided, e.g., by the MSC/VLR (e.g., via LSA), in which case the BSS component does not need to know the IMSI of the MS in order to determine whether the MS is authorized to use the HBTS.

Figure 13:
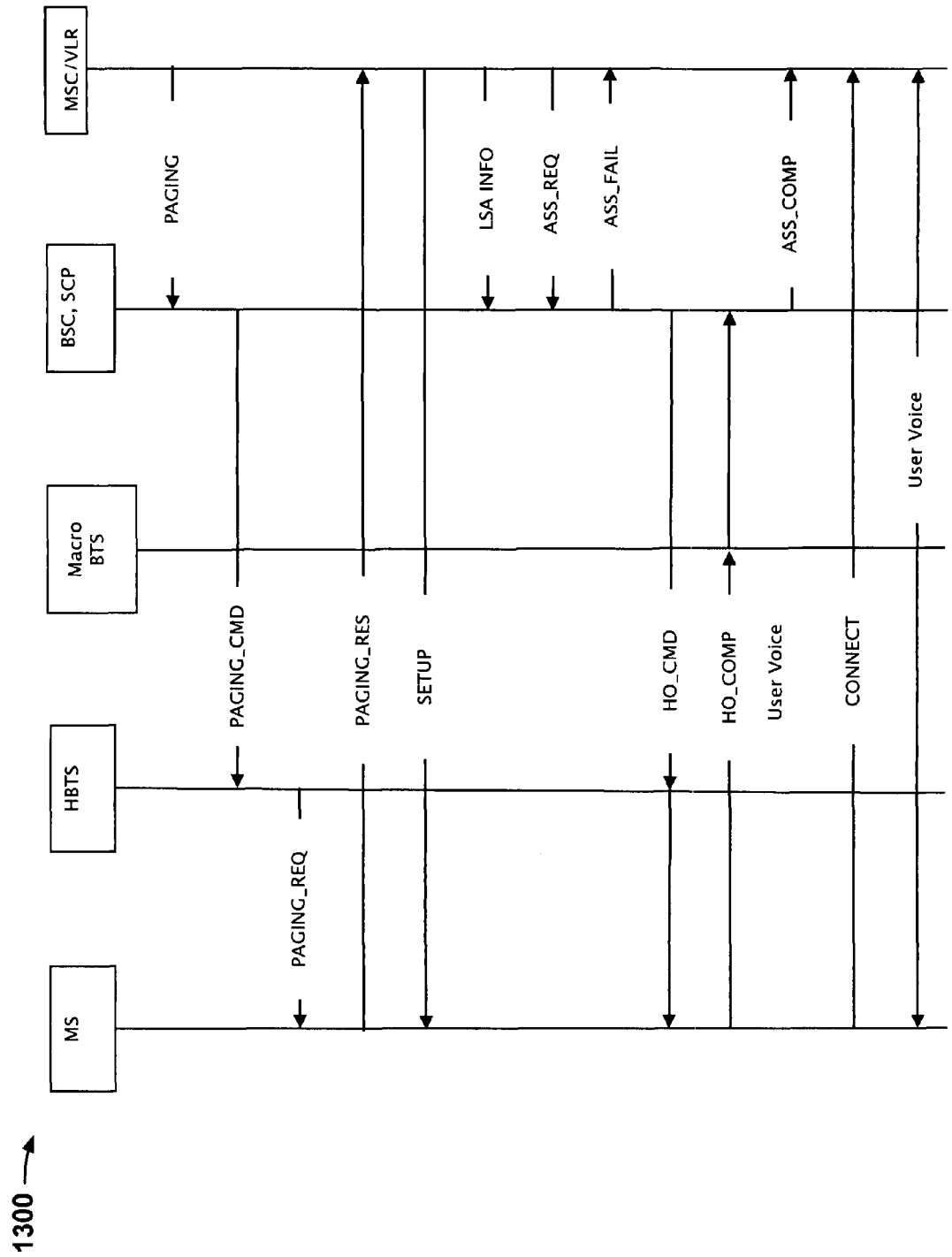
FIG. 13 is a call flow diagram illustrating an embodiment of a process for controlling access to a mobile network in the case of a mobile terminated call attempted to be connected via an HBTS to a user not authorized to use the HBTS for that purpose.

FIG. 13 is a call flow diagram illustrating an embodiment of a process for controlling access to a mobile network in the case of a mobile terminated call attempted to be connected via an HBTS to a user not authorized to use the HBTS for that purpose. Upon observing an attempt to terminate via the HBTS a call to an unauthorized MS, in the example call flow 1300 the BSC sends to the MS a handover command ("HO_CMD") message instructing the MS to complete a handover to a macro-BTS. Upon receiving a handover complete ("HO_COMP") message from the MS, via the macro-BTS, the BSC allows the call to be terminated. In some embodiments, the MSC does not send local security association (LSA) information to the BSC, as shown in FIG. 13, and instead the BSC or another BSS component is configured to determine whether the MS is authorized to use the HBTS or not. In some embodiments, the BSC or other BSS component obtains the IMSI of the MS (e.g., either on its own or via the MSC/VLR) and uses the IMSI to query an authorization database. In some embodiments, the BSC or other BSS component is provided, e.g., by the MSC/VLR (e.g., via LSA), in which case the BSS component does not need to know the IMSI of the MS in order to determine whether the MS is authorized to use the HBTS.

Figure 14:
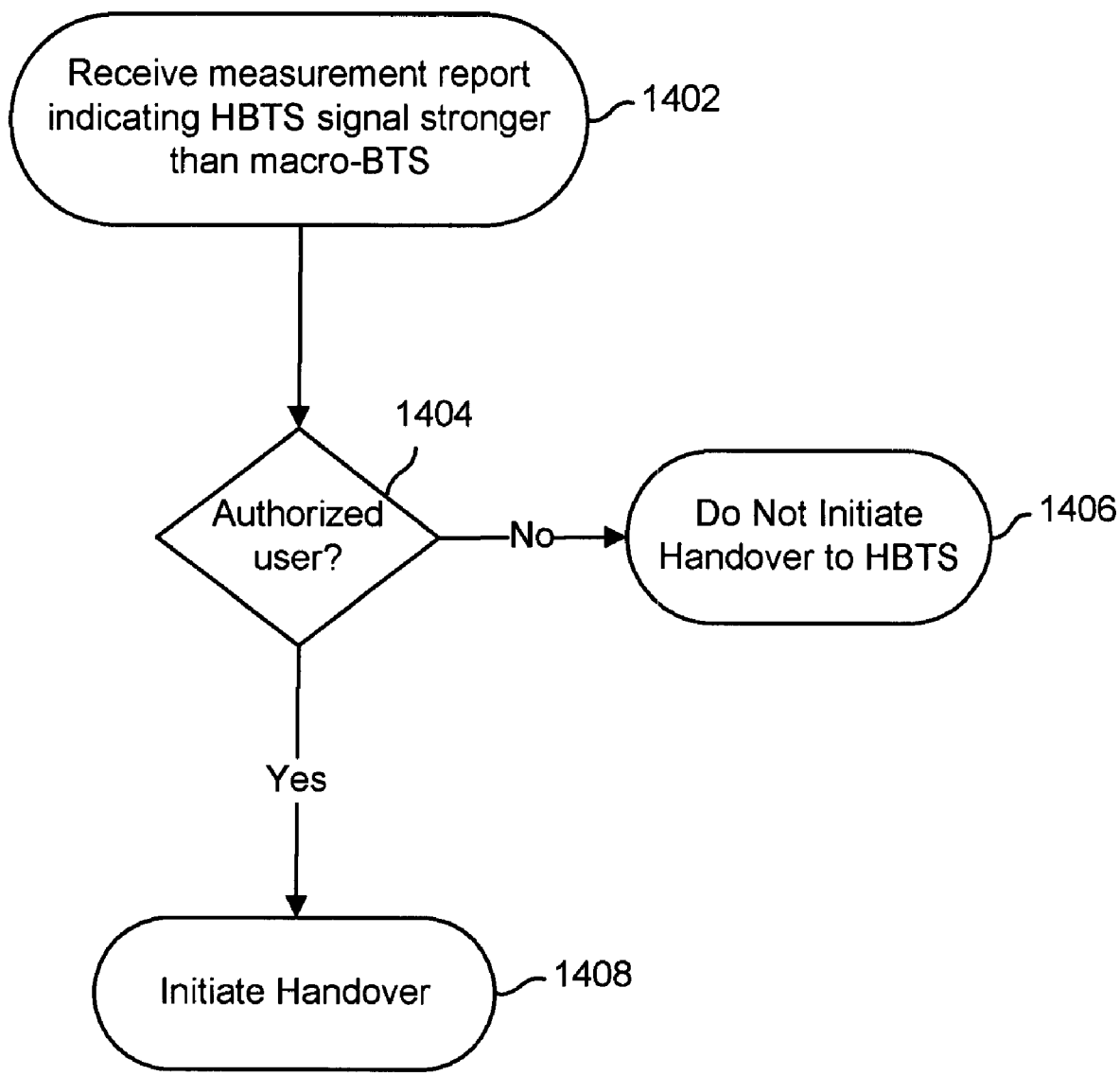
FIG. 14 is a flow chart illustrating an embodiment of a process for controlling access to a mobile network by only allowing authorized users of an HBTS to complete a handover to an HBTS.

FIG. 14 is a flow chart illustrating an embodiment of a process for controlling access to a mobile network by only allowing authorized users of an HBTS to complete a handover to an HBTS. In some embodiments, the process of FIG. 14 is implemented by a BSC with which the HBTS is associated, e.g., via which the HBTS has connectivity to an associated core mobile network. In the example shown, a measure report indicating that an HBTS's signal is stronger than a currently-serving (e.g., macro-) BTS is received (1402). It is determined whether the MS from which the measurement report was received is an authorized user of the HBTS (1404). If so, a handover to the HBTS is initiated (1408). If not, the MS continues to access the mobile network via the currently-serving BTS (1406), if applicable and/or available, or if applicable handover may be initiated to a cell other than the HBTS.

Configuring a mobile station (MS) to control access to a mobile network is disclosed. In some embodiments, an MS is configured, e.g., via the subscriber identity module (SIM) toolkit (STK) and/or one or more other applications running on and/or devices comprising the MS, to drop and/or otherwise prevent the MS being used to make, receive, and/or continue calls or other communications with or through a mobile network via an HBTS of which the MS is not an authorized user. In various embodiments, an STK application configured to cause the MS to drop and/or otherwise prevent the MS being used to make, receive, and/or continue calls or other communications with or through a mobile network via an HBTS of which the MS is not an authorized user is installed in the SIM before and/or after giving the SIM to the subscriber, e.g., in connection with providing an MS to the subscriber and/or configuring same. In some embodiments, over-the-air (OTA) is used to install such an application after the SIM has been given to the subscriber. Kits for installing such an application before and/or after giving the SIM to the subscriber are available commercially from Gemplus SA (also known as Gemalto NV) and others.

Figure 15:
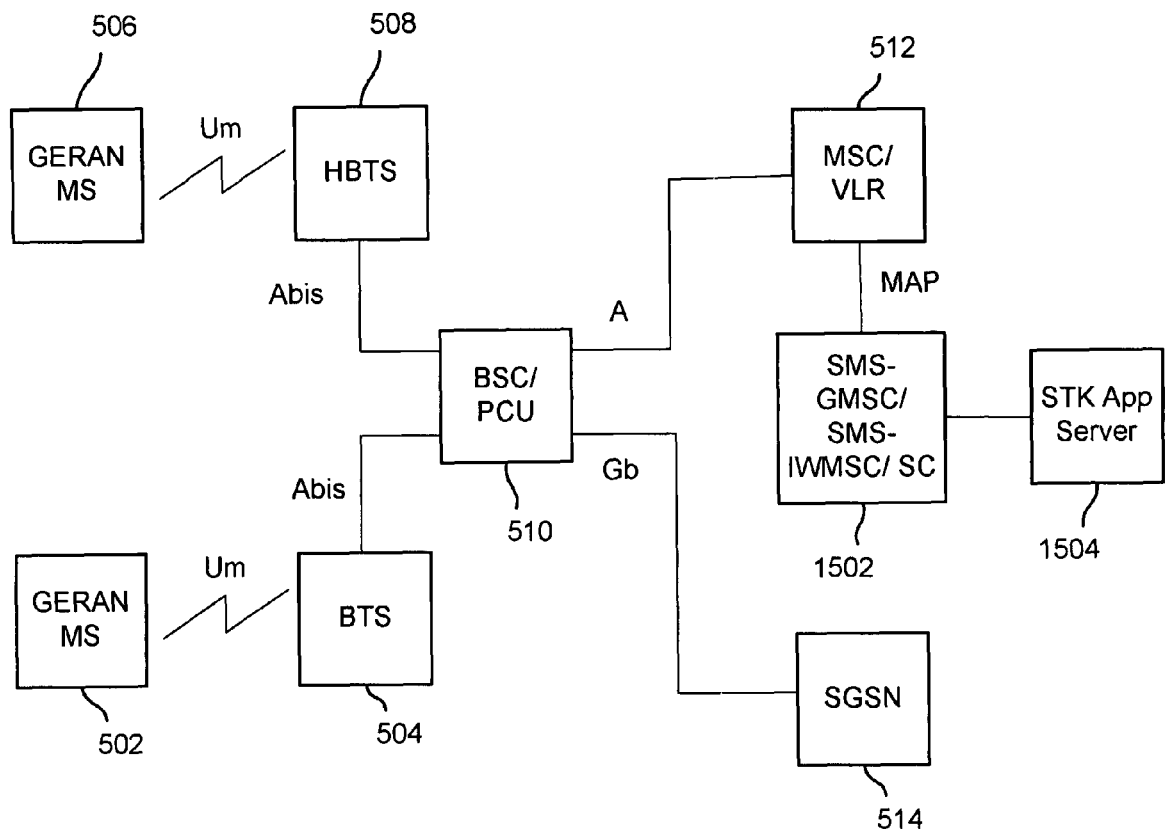
FIG. 15 is a block diagram illustrating an embodiment of a system for controlling access to a mobile network.

FIG. 15 is a block diagram illustrating an embodiment of a system for controlling access to a mobile network. In the example shown, the MSC 512 is connected via a MAP interface to a gateway MSC for short message service (SMS-GMSC)/inter-working MSC for short message service (SMS-IWMSC)/SMS service center (SM-SC) 1502, which is in turn connected to an STK application server 1504. In the example shown, a SIM application toolkit (STK) client/application configured to prevent use of an HBTS by an MS not authorized to use the HBTS is downloaded from STK application server 1504 to the MS, e.g., MS 502 and/or MS 506. The STK client/application in some embodiments implements one or more of the processes illustrated by FIGS. 16A-18B, described more fully below.

Figure 16A:
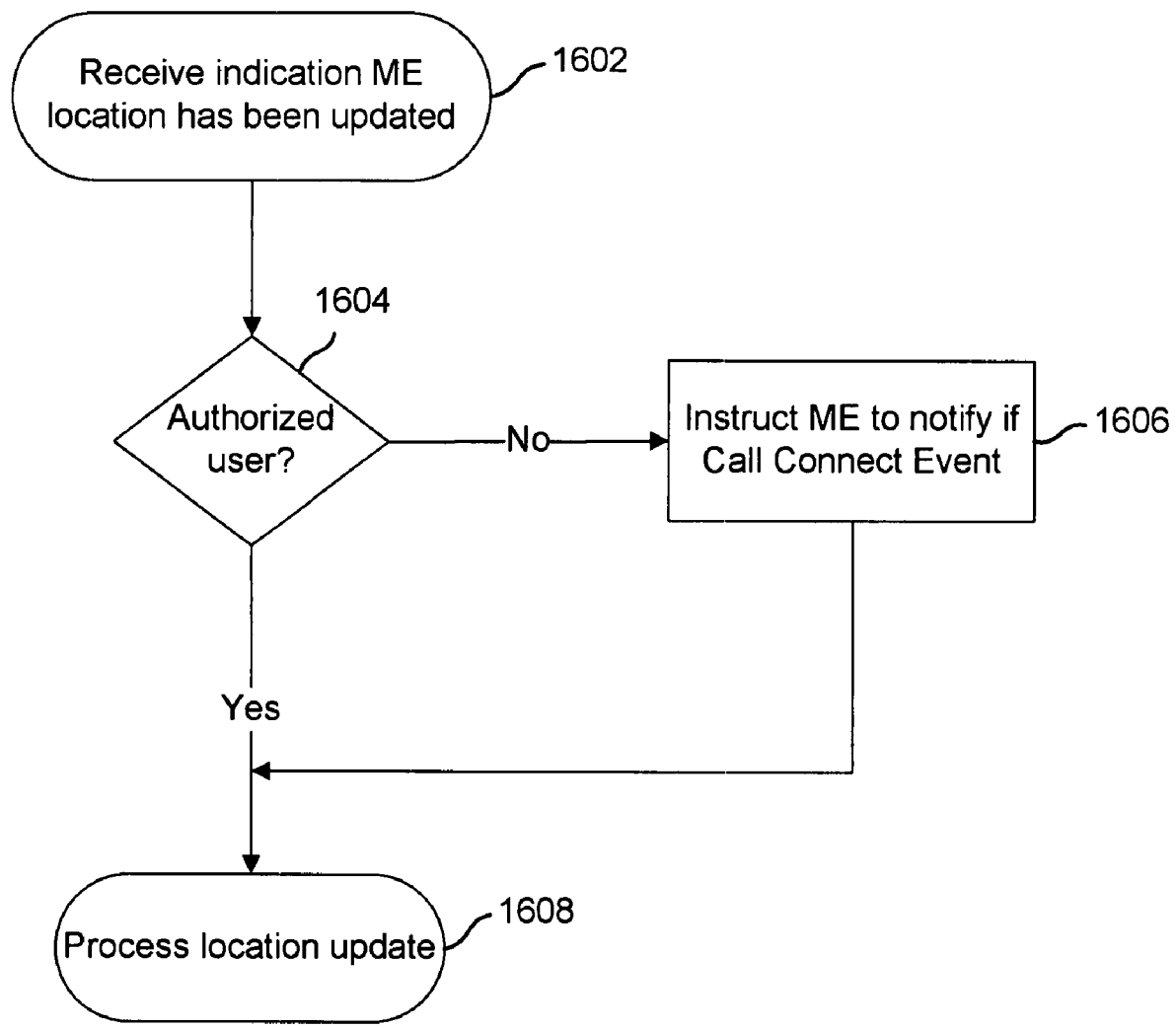
FIG. 16A is a flow chart illustrating an embodiment of a process for controlling access to a mobile network.

FIG. 16A is a flow chart illustrating an embodiment of a process for controlling access to a mobile network. In some embodiments, the process of FIG. 16A is implemented by an STK application running on an MS. The MS comprises a mobile equipment (ME) and an STK application running on and/or associated with a SIM installed on the ME. An indication is received that a location update has been performed (1602). The indication includes an identification of the BTS to which the location has been updated, at least in the case of a location update to an HBTS. It is determined whether the MS is associated with an authorized user of the HBTS (1604). If not, the ME is instructed to send a notification, e.g., to an STK application implementing the process of FIG. 16A, if a Call Connect event occurs. If the MS is associated with an authorized user of the HBTS or once the ME has been instructed to send the Call Connect event notification, the location update is processed normally (1608).

Figure 16B:
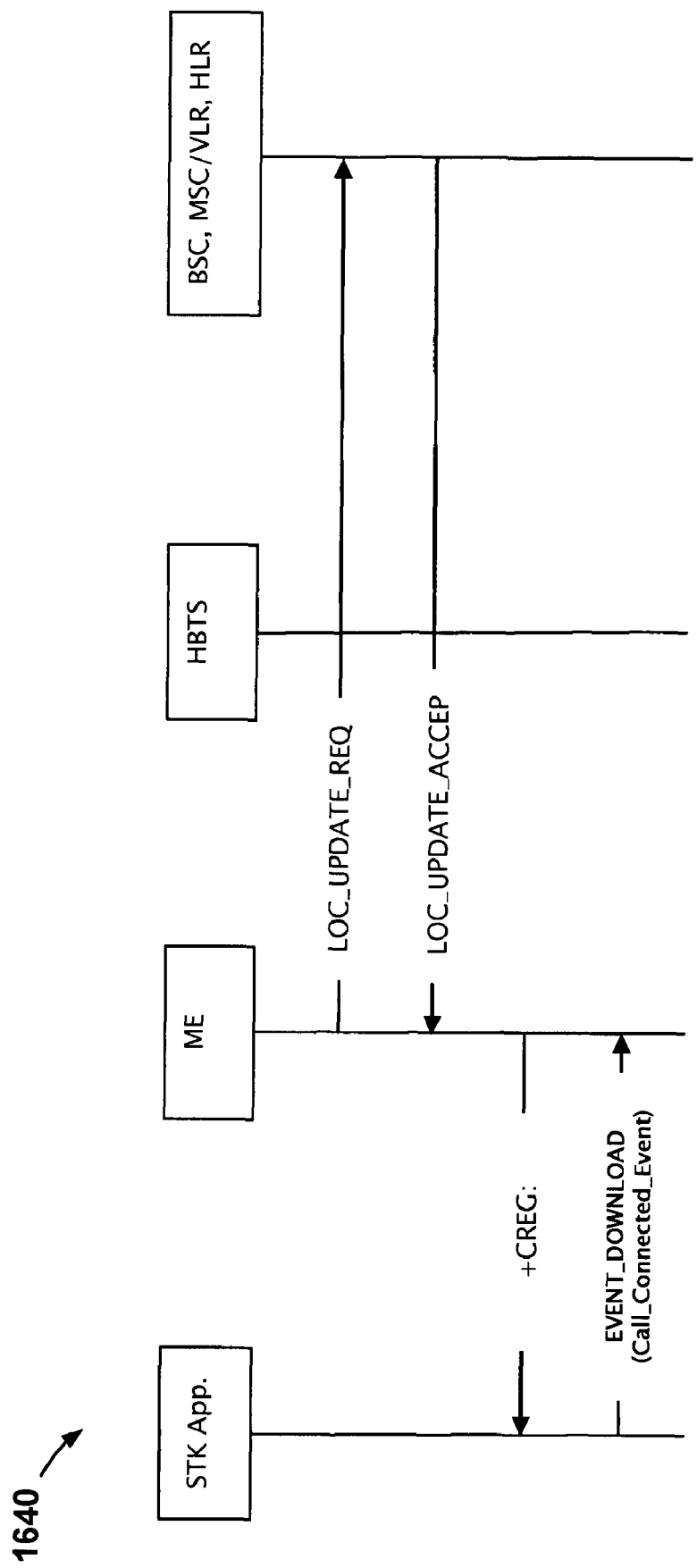
FIG. 16B is a call/message flow diagram illustrating an embodiment of a process for controlling access in a mobile network.

FIG. 16B is a call/message flow diagram illustrating an embodiment of a process for controlling access in a mobile network. In the example shown, the STK application and mobile equipment (ME) comprise a mobile station (MS) and messages between the STK application and the ME are internal to the MS. As indicated in the call flow 1640, upon receiving notification via the +CREG message that the location of the MS has been updated to an HBTS, an event download command instructing the ME to notify the STK application of any call connect event is sent by the STK application to the ME.

Figure 17A:
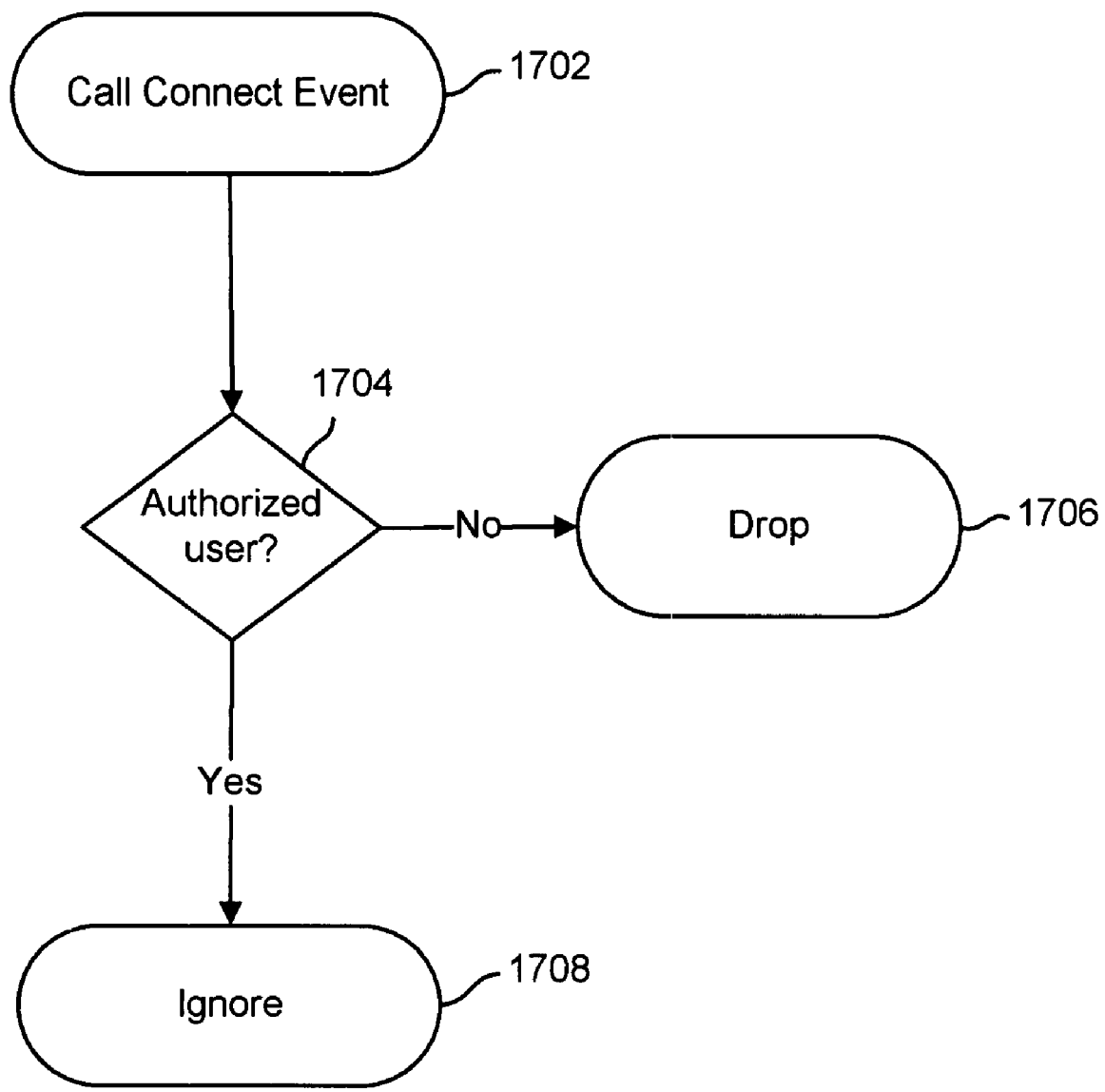
FIG. 17A is a flow chart illustrating an embodiment of a process for controlling access to a mobile network.

FIG. 17A is a flow chart illustrating an embodiment of a process for controlling access to a mobile network. In some embodiments, the process of FIG. 17A is implemented by an STK application. A call connect event notification is received (1702). It is determined whether the MS at which the call connect event has occurred is an authorized user of a current BTS via which the MS currently is connected to the mobile network (1704). If not, e.g., the MS is not an authorized user of an HBTS to which its location has been updated, the call is dropped (1706). Otherwise, no further action is taken and the call is allowed to proceed (1708).

Figure 17B:
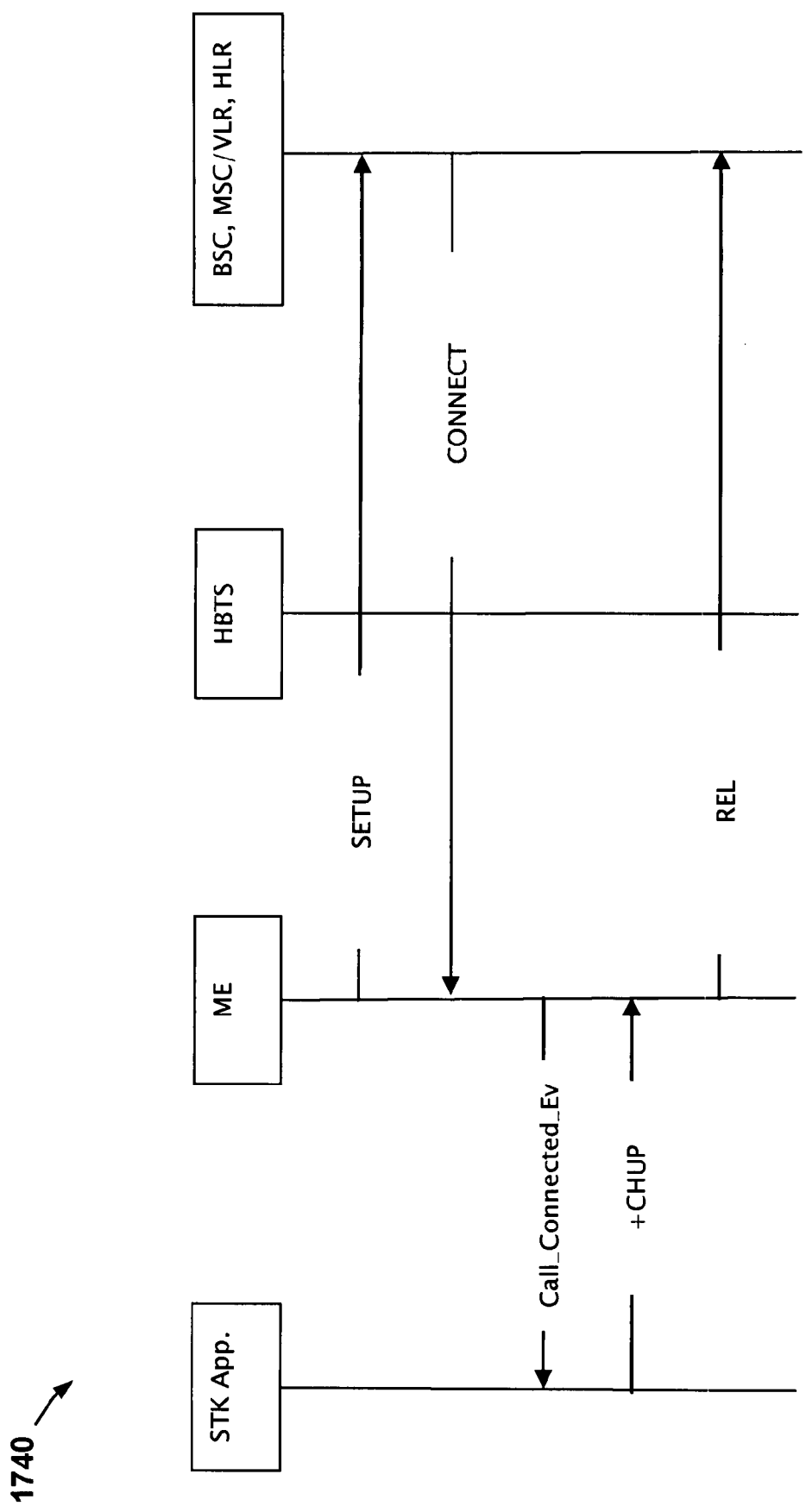
FIG. 17B is a call/message flow diagram illustrating an embodiment of a process for controlling access in a mobile network.

FIG. 17B is a call/message flow diagram illustrating an embodiment of a process for controlling access in a mobile network. In the call/message flow 1740 shown, upon receiving an indication that a call has been connected via an HBTS with respect to which the ME is not an authorized user, a +CHUP message is sent by the STK application to the ME to cause the ME to drop the call.

Figure 18A:
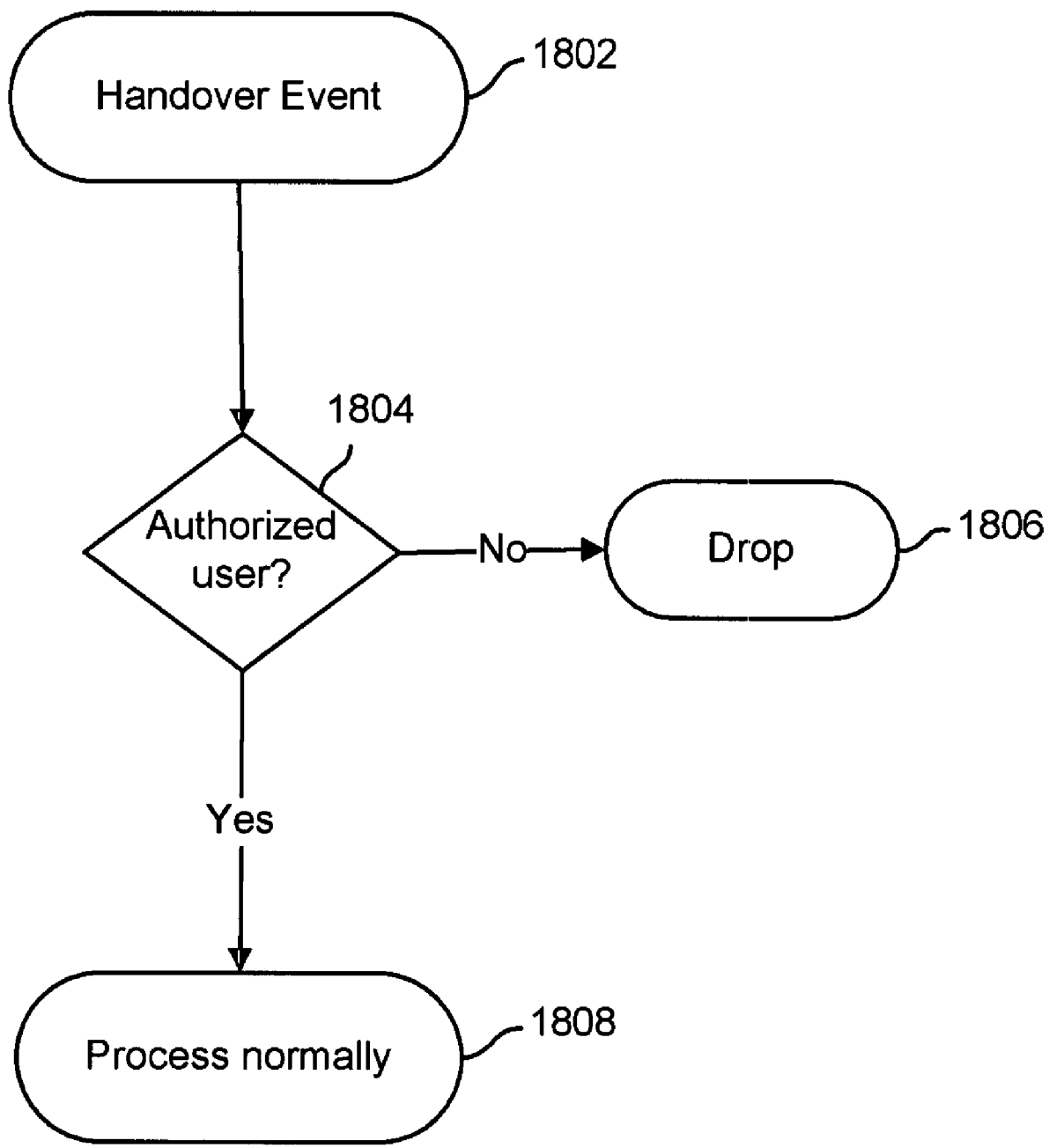
FIG. 18A is a flow chart illustrating an embodiment of a process for controlling access to a mobile network.

FIG. 18A is a flow chart illustrating an embodiment of a process for controlling access to a mobile network. In some embodiments, the process of FIG. 18A is implemented by an STK application and performed in the event a handover event occurs while a call is connected or other communication is occurring. An indication that a handover event has occurred during a call or other communication session is received (1802). It is determined whether the handover was to a BTS of which the MS is an authorized user (1804). If not, the call is dropped (1806). Otherwise, the call continues to be processed normally (1808).

Figure 18B:
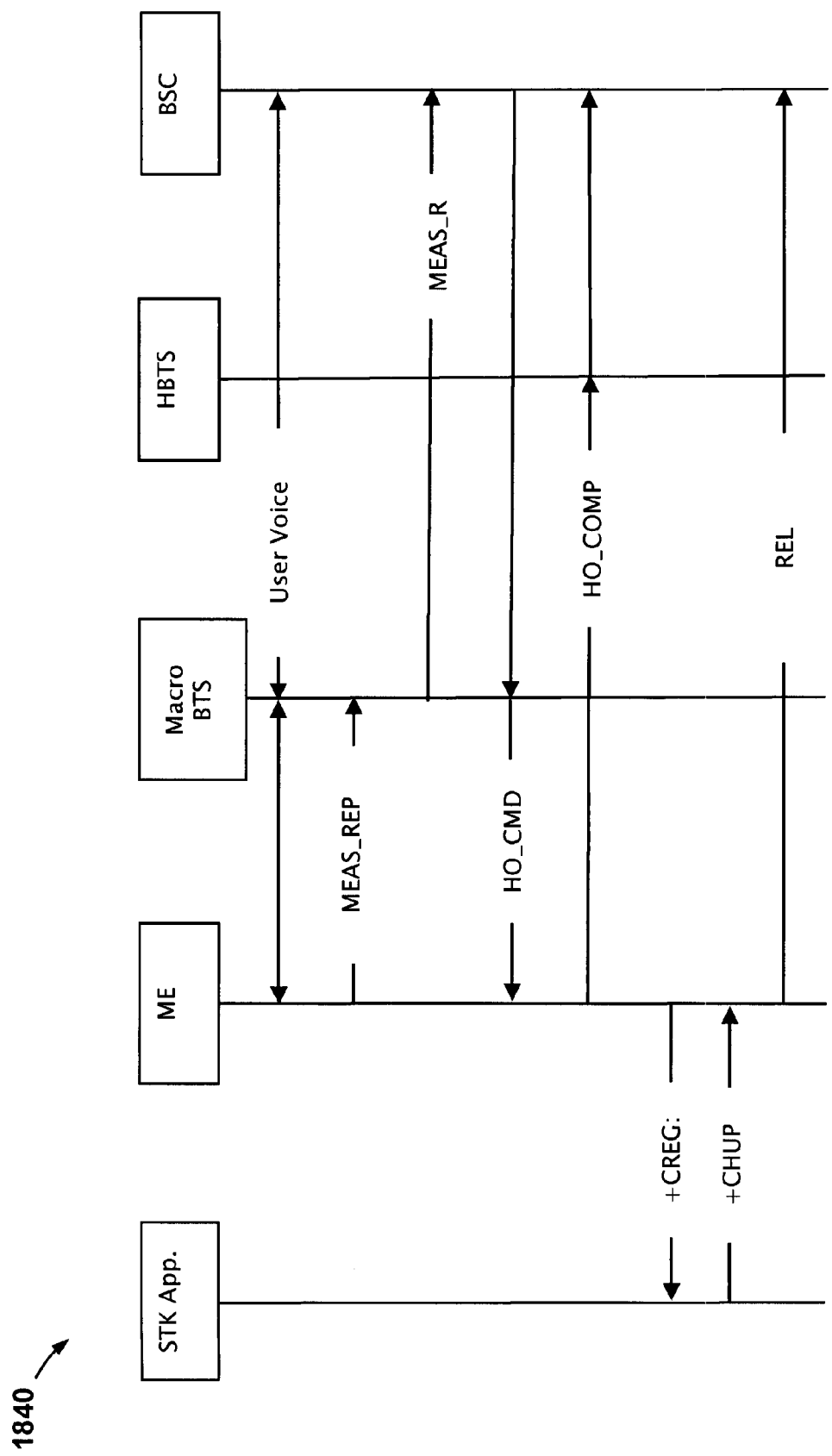
FIG. 18B is a call/message flow diagram illustrating an embodiment of a process for controlling access in a mobile network.

FIG. 18B is a call/message flow diagram illustrating an embodiment of a process for controlling access in a mobile network. In the call/message flow 1840 shown, upon receiving an indication that a handover has been completed, during a call or other communication session, to an HBTS with respect to which the ME is not an authorized user, a +CHUP message is sent by the STK application to the ME to cause the ME to drop the call.

While in many of the examples described in detail above the mobile network equipment/elements are identified by terms applicable in GSM and/or related networks, the techniques described herein may be applied as well in other networks and implemented in such networks by any suitable node or element, as applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of facilitating use of a restricted base transceiver station, comprising:

providing to a first set of subscribers associated with a mobile network operator access to a mobile network via base transceiver stations associated with a first mobile network identifier code ("MNC") associated with the mobile network operator, but not via restricted base transceiver stations associated with a second MNC associated with the mobile network operator; and providing to each of a second set of subscribers associated with the mobile network operator access to the mobile network via a corresponding subset of a set of restricted base transceiver stations associated with the second MNC, the coverage area of at least one of the restricted base transceiver stations is completely with the coverage area of one of the base transceiver stations associated with the first MNC, the subset including, for each subscriber in the second set, one or more restricted base transceiver stations with respect to which that subscriber is an authorized user, wherein mobile stations associated with the second set of subscribers are configured with a primary network identifier that matches the second MNC and the primary network identifier identifies said mobile stations associated with the second set of subscribers as being associated with members of said second set of subscribers, wherein the mobile stations associated with the second set of subscribers provide access to the mobile network via at least the base stations associated with the first MNC and the subset of the restricted base transceiver stations, wherein the base transceiver stations associated with the first MNC are macrocellular base transceiver stations and the restricted base transceiver stations are not macrocellular base transceiver stations, wherein, if one of the restricted base transceiver stations receives a location update request from one of the mobile stations associated with the first set of subscribers, then the location update request is sent to a mobile switching center where the location update request is refused, wherein the restricted base transceiver stations are coupled to an aggregated gateway through an IP network, wherein the aggregated gateway is connected to a shared base station controller through a respective dedicated link, and wherein the base transceiver stations associated with the first MNC and the aggregated gateway each has a respective dedicated communication link to the shared base station controller.

2. A method as recited in claim 1, further comprising associating a first set of base transceivers stations with the first MNC and associating the second set of base transceivers stations with the second MCN associated with the mobile network operator.

3. A method as recited in claim 1, wherein the second set of subscribers comprises a subset of the first set of subscribers.

4. A method as recited in claim 1, further comprising allowing subscribers of the second set to access the mobile network via base transceiver stations included in the first set.

5. A method as recited in claim 1, wherein not providing to the first set of subscribers access to the mobile network via restricted base transceiver stations included in the second set comprises rejecting an attempt by a mobile station associated with a subscriber included in the first set of subscribers to update its location to a restricted base transceiver station included in the second set of restricted base transceiver stations.

6. A method as recited in claim 1, wherein the first MNC and the second MNC are associated with the mobile network operator but are not specific to a particular location area within the mobile network.

7. A method as recited in claim 1, wherein providing to a subscriber in the second set of subscribers access to the mobile network via a subset of a set of restricted base transceiver stations associated with the second MNC comprises configuring a base station controller or other base station subsystem node with which a restricted base transceiver station that is associated with the second MNC but which is not included in the subset is associated to force a handover, within the mobile network of the same mobile network operator, from the base transceiver not included in the subset to a more appropriate base transceiver station in the event a call or other communication is attempted to be made to or by a second subscriber via the base transceiver station not included in the subset.

8. A method as recited in claim 1, wherein providing to a subscriber in the second set of subscribers access to the mobile network via a subset of a set of restricted base transceiver stations associated with the second MNC comprises configuring a base station controller or other base station subsystem node with which a restricted base transceiver station that is associated with the second MNC but which is not included in the subset is associated to prevent a mobile station associated with the subscriber from being handed over to the restricted base transceiver not included in the subset.

9. A method as recited in claim 1, wherein providing to a subscriber in the second set of subscribers access to the mobile network via a subset of a set of restricted base transceiver stations associated with the second MNC comprises configuring a mobile station associated with the subscriber to drop a call or other communication session that is connected via or handed over to a restricted base transceiver station that is associated with the second MNC but which is not included in the subset.

10. A method as recited in claim 1, wherein the set of restricted base transceiver stations associated with the second MNC comprises one or more home or other small scale base transceiver stations.

11. A method as recited in claim 1, wherein the base transceiver stations associated with the first MNC comprise one or more macro base transceiver stations.

12. The method of claim 1 wherein the second MNC is a home base transceiver station ("HBTS")-specific MNC.

13. The method of claim 1 wherein the primary network identifier is a first priority public land mobile network ("PLMN") in the Equivalent HPLMN ("EHPLMN") list.

14. The method of claim 1 wherein the primary network identifier is a home PLMN ("HPLMN").

15. The method of claim 1 wherein the mobile stations associated with the first set of subscribers are configured to include a PLMN associated with the HBTS-specific MNC in a list of PLMN's the mobile station is prohibited to use as a visiting user.

16. A mobile network, comprising:
a subscriber database configured to store data associating a first set of subscribers with a first MNC associated with a mobile network operator but not with a second MNC associated with the mobile network operator and data associating each of a second set of subscribers associated with the mobile network operator with at least the second MNC; and
a processor configured to deny a subscriber, associated with the first MNC, but not the second MNC, access to the mobile network via a restricted base transceiver station associated with the second MNC and to allow the subscriber in the second set of subscribers to access the mobile network via at least a subset of a set of restricted base transceiver station associated with the second MNC and base transceiver stations associated with the first MNC, the coverage area of at least one of the restricted base transceiver stations is completely with the coverage area of one of the base transceiver stations associated with the first MNC,
wherein mobile stations associated with the second set of subscribers are configured with a primary network identifier that matches the second MNC and the primary network identifier identifies said mobile stations associated with the second set of subscribers as being associated with members of said second set of subscribers,
wherein the mobile stations associated with the second set of subscribers provide access to the mobile network via at least the base transceiver stations associated with the first MNC and the subset of the restricted base transceiver stations,
wherein the base transceiver stations associated with the first MNC are macrocellular base transceiver stations and the restricted base transceiver stations are small scale base transceiver stations,
wherein, if one of the small scale base transceiver stations receives a location update request from one of the mobile stations associated with the first set of subscribers, then the location update request is sent to a mobile switching center where the location update request is refused,
wherein the small scale base transceiver stations are coupled to an aggregated gateway via an IP network,
wherein the aggregated gateway is connected to a shared base station controller via a dedicated link, and
wherein the base transceiver stations associated with the first MNC and the aggregated gateway each has a respective dedicated communication link to the shared base station controller.

17. A mobile network as recited in claim 16, wherein the processor is further configured to prevent said subscriber associated with the second MNC from accessing the mobile network via a restricted base transceiver station that is associated with the second MNC but which is not included in said subset of restricted base transceiver station associated with the second MNC with respect to which the subscriber associated with the second MNC is an authorized user.

18. A mobile network as recited in claim 15, further comprising a base station controller or other base station subsystem node configured to force a mobile station associated with said subscriber associated with the second MNC to be handed over, within the mobile network of the same mobile network operator, to a more appropriate cell in the event a call or other communication session involving the mobile station is connected or attempted to be connected via a restricted base transceiver station that is associated with the second MNC but which is not included in said subset of restricted base transceiver station associated with the second MNC with respect to which the subscriber associated with the second MNC is an authorized user.

19. A mobile network as recited in claim 16 further comprising a base station controller or other base station subsystem node configured to prevent a mobile station associated with said subscriber associated with the second MNC from being handed over to a restricted base transceiver station that is associated with the second MNC but which is not included in said subset of restricted base transceiver station associated with the second MNC with respect to which the subscriber associated with the second MNC is an authorized user.

20. The network of claim 16 wherein the second MNC is a HBTS-specific MNC.

21. The network of claim 16 wherein the primary network identifier is a first priority PLMN in the EHPLMN list.

22. The network of claim 16 wherein the primary network identifier is a HPLMN.

23. The network of claim 15 wherein the mobile stations associated with the first set of subscribers are configured to include a PLMN associated with the HBTS-specific MNC in a list of PLMN's the mobile station is prohibited to use as a visiting user.

24. A mobile station, comprising:
a memory configured to store a data that identifies the mobile station as being associated with an MNC that is associated with small scale base transceiver stations associated with a mobile network operator but not with one or more macro base transceiver stations associated with the mobile network operator, wherein one of said macro base transceiver stations provides coverage in a first area that completely covers a second coverage area provided by one of said small scale base transceiver stations; and
a processor configured to cause the mobile station to be handed over, within a mobile network of the same mobile network operator, from said one macro base transceiver station to said one small scale base transceiver station as a result of the mobile station being in the coverage area of said one small scale base transceiver station and as a result of the mobile station being an authorized user of said small scale base transceiver station,
wherein the small scale base transceiver stations are connected to an aggregated gateway through an IP network, wherein the aggregated gateway is connected to a shared base station controller through a respective dedicated link, and wherein the one or more macro base transceiver stations are connected to the shared base station controller a through respective dedicated communication lines, and
wherein, if mobile attempts to location update with a macro base transceiver or a small scale base transceiver station with which the mobile is not associated, then the shared base station controller sends a location update request to a mobile switching center where the location update request is refused.

* * * * *

UNITED STATES PATENT AND TRADEMARK OFFICE
CERTIFICATE OF CORRECTION

PATENT NO.        : 7,792,530 B2                                Page 1 of 1
APPLICATION NO.   : 11/811895
DATED             : September 7, 2010
INVENTOR(S)       : Ahmed Tariq et al.

It is certified that error appears in the above-identified patent and that said Letters Patent is hereby corrected as shown below:

Column 15, line 63 delete "claim 15," and insert --claim 16,--.

Column 16, line 11 delete "claim 16" and insert --claim 16,--.

Column 16, line 26 delete "claim 15" and insert --claim 16--.

Signed and Sealed this
Seventeenth Day of April, 2012

David J. Kappos
*Director of the United States Patent and Trademark Office*